United States Patent
Uchida

(10) Patent No.: US 11,650,660 B2
(45) Date of Patent: May 16, 2023

(54) ELECTRONIC DEVICE, CONTROL METHOD, AND NON-TRANSITORY COMPUTER READABLE MEDIUM

(71) Applicant: CANON KABUSHIKI KAISHA, Tokyo (JP)

(72) Inventor: Takeshi Uchida, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/945,027

(22) Filed: Jul. 31, 2020

(65) Prior Publication Data

US 2021/0034151 A1 Feb. 4, 2021

(30) Foreign Application Priority Data

Aug. 2, 2019 (JP) .............................. JP2019-143077
Oct. 11, 2019 (JP) .............................. JP2019-187540
Apr. 9, 2020 (JP) .............................. JP2020-070176

(51) Int. Cl.
*G06F 3/01* (2006.01)
*G06T 7/70* (2017.01)
(Continued)

(52) U.S. Cl.
CPC .............. *G06F 3/013* (2013.01); *G06T 7/70* (2017.01); *H04N 5/2256* (2013.01);
(Continued)

(58) Field of Classification Search
CPC .................. G06F 3/013; G06T 7/70; G06T 2207/30201; H04N 5/232945; H04N 5/232935; H04N 5/2256; H04N 5/23293
See application file for complete search history.

(56) References Cited

U.S. PATENT DOCUMENTS

2015/0199007 A1 7/2015 Lee et al.
2016/0373156 A1* 12/2016 McDonald .............. H04M 1/04
(Continued)

FOREIGN PATENT DOCUMENTS

JP 2004-008323 A 1/2004
JP 2009-104524 A 5/2009
(Continued)

OTHER PUBLICATIONS

The above U.S. patent documents were cited in a European Search Report dated Dec. 9, 2020 which is enclosed, that issued in the corresponding European Patent Application No. 20188840.1.
(Continued)

*Primary Examiner* — Joseph W Becker
(74) *Attorney, Agent, or Firm* — Cowan, Liebowitz & Latman, P.C.

(57) ABSTRACT

An electronic device according to the present invention is an electronic device capable of acquiring an eye image by capturing an image of an eye looking at a screen of a display through an eye window frame, and includes at least one memory and at least one processor which function as: an estimating unit configured to estimate a viewed point of the eye on the screen on a basis of the eye image; and a detecting unit configured to detect a shifted viewing state in which the eye shifts from a position corresponding to a center of the screen on the eye image, on a basis of a position of a pupil image or a Purkinje image on the eye image.

14 Claims, 30 Drawing Sheets

(51) Int. Cl.
H04N 5/232 (2006.01)
H04N 5/225 (2006.01)

(52) U.S. Cl.
CPC .......... *H04N 5/232935* (2018.08); *H04N 5/232945* (2018.08); *G06T 2207/30201* (2013.01)

(56) References Cited

U.S. PATENT DOCUMENTS

| | | |
|---|---|---|
| 2018/0039327 A1 | 2/2018 | Noda et al. |
| 2018/0348861 A1 | 12/2018 | Uscinski et al. |
| 2021/0141451 A1* | 5/2021 | George-Svahn ...... G06F 3/0482 |

FOREIGN PATENT DOCUMENTS

| | | |
|---|---|---|
| JP | 2014-064094 A | 4/2014 |
| JP | 2018-506781 A | 3/2018 |
| WO | 2016/110451 A1 | 7/2016 |

OTHER PUBLICATIONS

The above U.S. Patent Application Publication document was cited in a European Search Report dated May 3, 2021, which is enclosed, that issued in the corresponding European Patent Application No. 20188840.1.

* cited by examiner

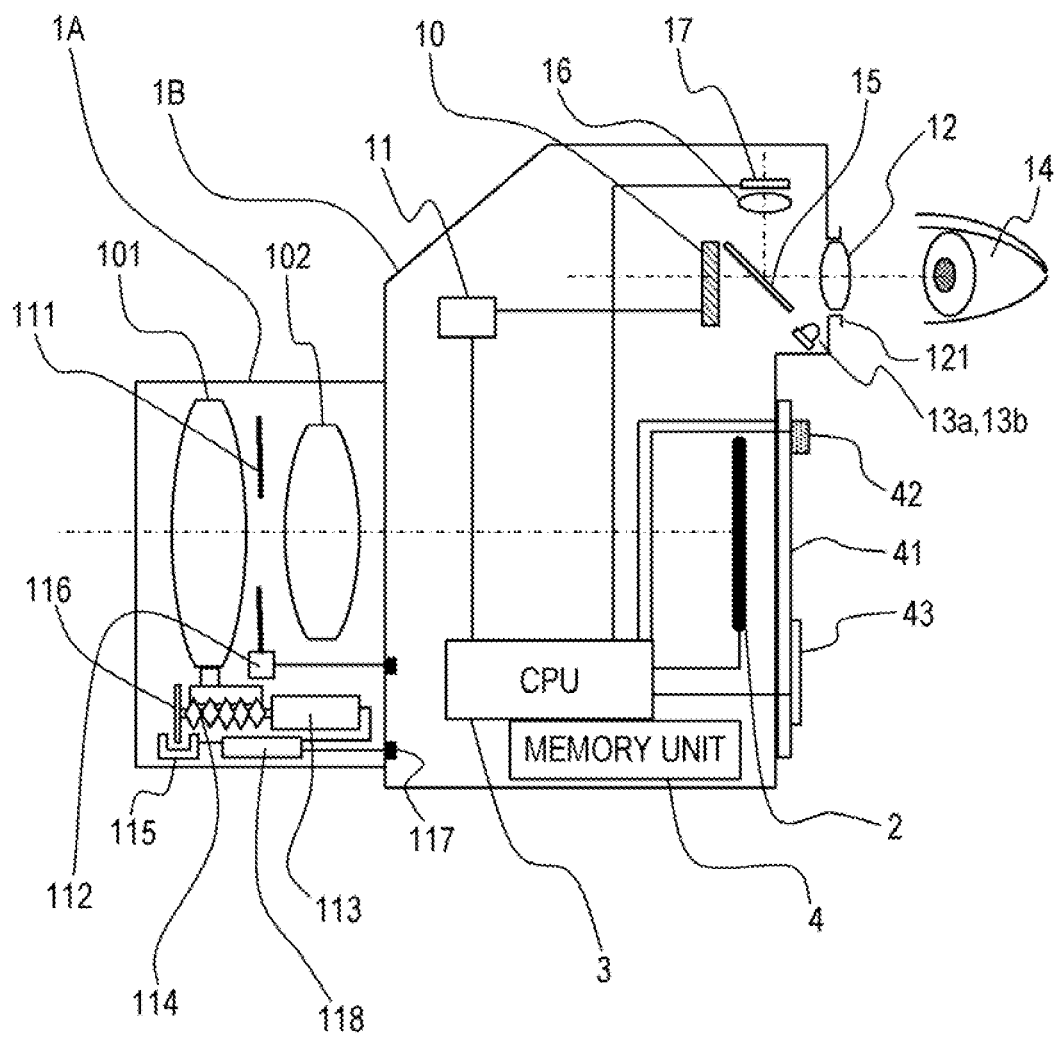
FIG. 2
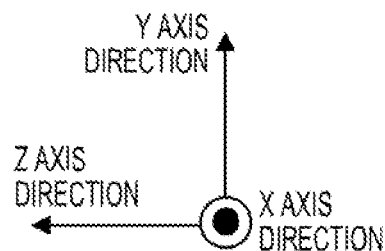

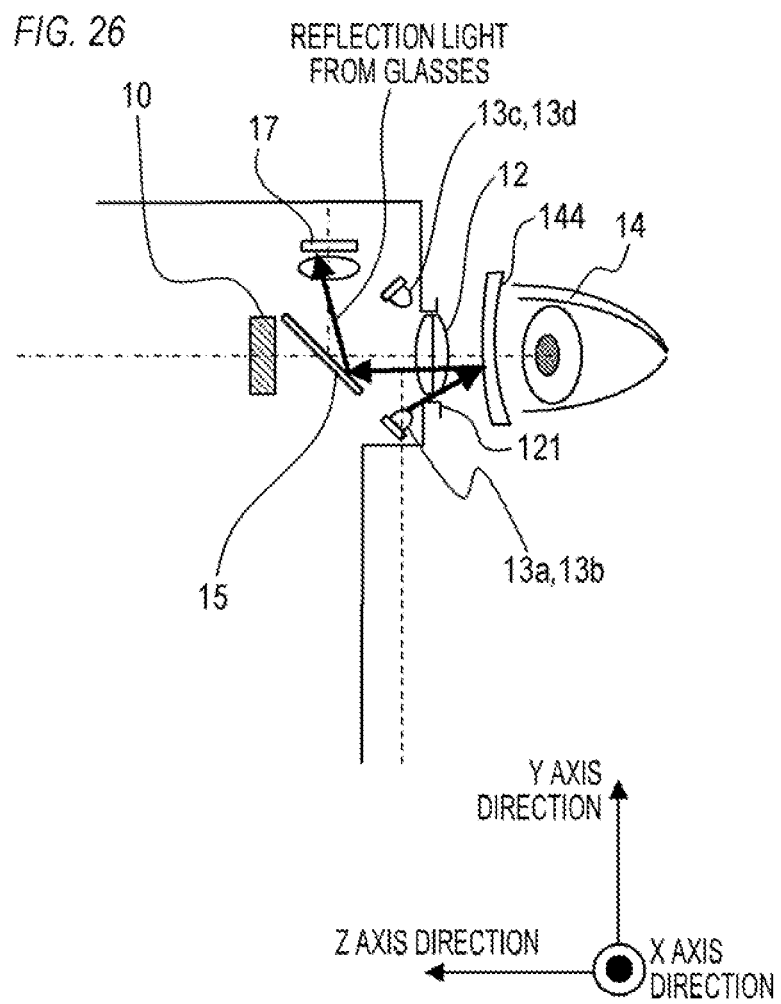

ELECTRONIC DEVICE, CONTROL METHOD, AND NON-TRANSITORY COMPUTER READABLE MEDIUM

BACKGROUND OF THE INVENTION

Field of the Invention

The present invention relates to an electronic device capable of estimating (detecting) a viewed point.

Description of the Related Art

Recent years have witnessed advances in camera automation and intelligentization. Japanese Patent Application Publication No. 2004-8323 proposes a technique for recognizing the intended object of a photographer looking through a viewfinder and controlling the focus on the basis of information about the viewed point (the visual line position) of the photographer, without manually inputting an object position. Japanese Patent Application Publication No. 2009-104524 proposes a technique for improving the precision of viewed point detection by taking into consideration the angle of rotation and position of the head in addition to the angle of rotation of the eyeball. Japanese Translation of PCT Application Publication No. 2018-506781 proposes a technique in which a plurality of eyeball lamps are provided, and a focus point is detected by switching the used eyeball lamp in accordance with a determination result as to whether or not light from the eyeball lamps is reaching the eyeballs of the user. Japanese Patent Application Publication No. 2014-64094 proposes a technique for switching an image display range (the range in which an image is displayed) on a display device within a viewfinder.

With the technique of Japanese Patent Application Publication No. 2004-8323, the viewed point of the user (the photographer) is estimated (detected) by detecting the angle of rotation of the eyeball on the basis of positions of a pupil image and a Purkinje image on an eye image acquired by capturing an image of the eye of the user. However, when the user shifts his/her face relative to the viewfinder or the like such that the head performs a large translational motion, the pupil image and Purkinje image on the eye image also perform a large translational motion, and as a result, the viewed point cannot be estimated with a high degree of precision.

With the technique of Japanese Patent Application Publication No. 2009-104524, the viewed point estimation precision is improved by capturing an image of the entire face, not only the eye, and detecting the position and incline of the head from characteristic points of the face so that the position and incline of the head are taken into consideration in addition to the angle of rotation of the eyeball. However, a configuration for capturing an image of the entire face (the entire head) is required, inviting increases in the complexity and cost of the device. Furthermore, the viewed point estimation precision cannot be improved in states where the head is hidden and the image of the head cannot be captured, such as a state where the user is looking through the viewfinder of the camera or a state where the user is wearing VR glasses (VR goggles).

With the technique of Japanese Translation of PCT Application Publication No. 2018-506781, the focus point is detected by switching the used eye lamp in accordance with the situation. However, a ghost image generated by the eyeball lamp may appear on the eye image, making it impossible to estimate the viewed point with a high degree of precision.

With the technique of Japanese Patent Application Publication No. 2014-64094, the image display range on the display device is normally narrowed for the purpose of power saving rather than estimating the viewed point. When estimating the viewed point, therefore, the image display range cannot be switched to an appropriate range, and as a result, the viewed point cannot be estimated with a high degree of precision.

SUMMARY OF THE INVENTION

The present invention provides a technique enabling a state in which viewed point estimation cannot be performed with a high degree of precision to be detected by a simple configuration.

The present invention in its first aspect provides an electronic device capable of acquiring an eye image by capturing an image of an eye looking at a screen of a display through an eye window frame, the electronic device comprising at least one memory and at least one processor which function as:

an estimating unit configured to estimate a viewed point of the eye on the screen on a basis of the eye image; and a detecting unit configured to detect a shifted viewing state in which the eye shifts from a position corresponding to a center of the screen on the eye image, on a basis of a position of a pupil image or a Purkinje image on the eye image.

The present invention in its second aspect provides a control method of an electronic device capable of acquiring an eye image by capturing an image of an eye looking at a screen of a display through an eye window frame, the control method comprising:

estimating a viewed point of the eye on the screen on a basis of the eye image; and detecting a shifted viewing state in which the eye shifts from a position corresponding to a center of the screen on the eye image, on a basis of a position of a pupil image or a Purkinje image on the eye image.

The present invention in its third aspect provides a non-transitory computer readable medium that stores a program, wherein the program causes a computer to execute a control method of an electronic device capable of acquiring an eye image by capturing an image of an eye looking at a screen of a display through an eye window frame, and the control method includes:

estimating a viewed point of the eye on the screen on a basis of the eye image; and detecting a shifted viewing state in which the eye shifts from a position corresponding to a center of the screen on the eye image, on a basis of a position of a pupil image or a Purkinje image on the eye image.

Further features of the present invention will become apparent from the following description of exemplary embodiments with reference to the attached drawings.

BRIEF DESCRIPTION OF THE DRAWINGS

FIG. 2 is a sectional view of the camera according to the first embodiment;

FIG. 26 is a view showing a ghost image generation principle according to the fifth embodiment;

DESCRIPTION OF THE EMBODIMENTS

As noted above, in the prior art, it is impossible to estimate a viewed point (a visual line position) with a high degree of precision in cases such as when a pupil image and a Purkinje image on an eye image perform a large translational motion. In particular, when a user wearing glasses or the like looks through a viewfinder of a camera, it is often impossible to bring the eyeball close enough to the viewfinder, and as a result, it is often impossible to estimate the viewed point with a high degree of precision. More specifically, in a state where the eyeball has not been brought close enough to the viewfinder, the visual line may be blocked by an eyepiece window frame or the like of the viewfinder so that the visible range within the viewfinder is limited, and as a result, the edges of a screen inside the viewfinder may not be visible when looking through the viewfinder directly from the front. In this case, the user tends to move his/her head by a large translational motion from directly in front of the viewfinder in order to see the edges, with the result that the user looks through the viewfinder from an angle. The distance of the translational motion performed by the head when the user looks through the viewfinder from an angle is much larger than when the camera is used by a normal use method (as recommended by the manufacturer), and as a result, a non-negligible error occurs in the viewed point estimation result.

Hence, in the present invention, an oblique look-through state, in which the user looks through the viewfinder from an angle, is detected on the basis of the detected pupil image and Purkinje image, and adverse effects caused by the oblique look-through state (adverse effects on viewed point detection) are suppressed.

First Embodiment

A first embodiment of the present invention will be described below with reference to the attached figures.

Description of Configuration

Figure 1A:
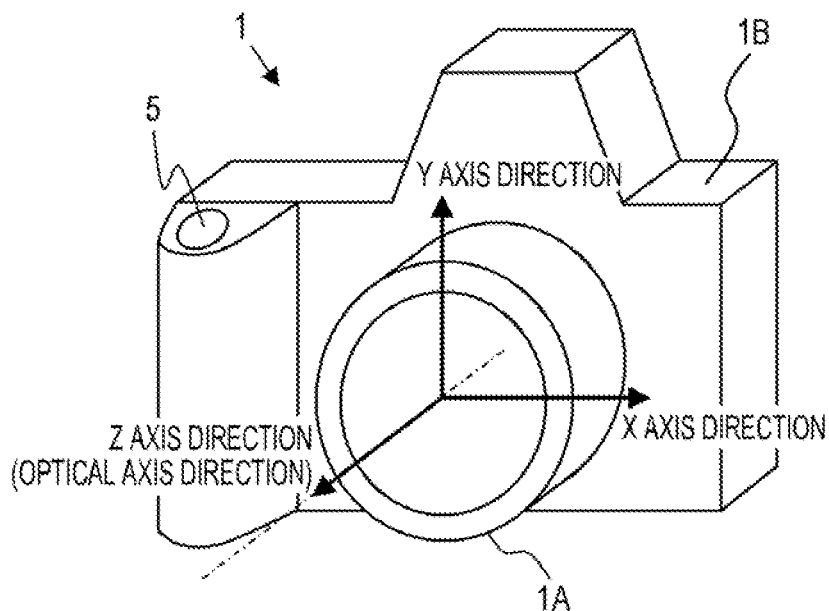
FIGS. 1A and 1B are external views of a camera according to a first embodiment.
Figure 1B:
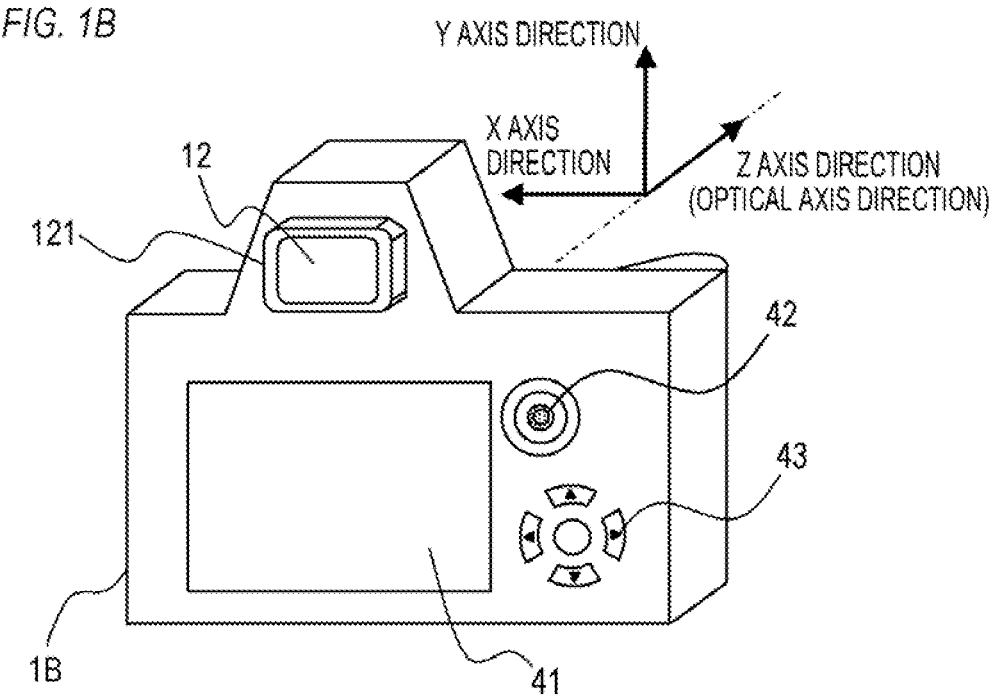

FIGS. 1A and 1B show the outer appearance of a camera 1 (a digital still camera; an interchangeable lens camera) according to a first embodiment. FIG. 1A is a front perspective view, and FIG. 1B is a back perspective view. As shown in FIG. 1A, the camera 1 includes an image-capturing lens unit 1A and a camera housing 1B. A release button 5, which is an operating member that receives image capturing operations from a user (a photographer), is disposed on the camera housing 1B. As shown in FIG. 1B, an eyepiece window frame 121 and an eyepiece lens 12 (an eyepiece optical system) through which the user looks at a display device 10 (a display panel), to be described below, provided inside the camera housing 1B are disposed on a back surface of the camera housing 1B. The eyepiece window frame 121 surrounds the eyepiece lens 12 and projects from the eyepiece lens 12 toward the outside (the back surface side) of the camera housing 1B. Note that the eyepiece optical system may include a plurality of lenses. Operating members 41 to 43 for receiving various operations from the user are also disposed on the back surface of the camera housing 1B. For example, the operating member 41 is a touch panel for receiving touch operations, the operating member 42 is an operating lever that can be pushed down in respective directions, and the operating member 43 is a four-direction key that can be pushed in each of four directions. The operating member 41 (the touch panel) includes a display panel such as a liquid crystal display and has a function for displaying images on the display panel.

FIG. 2 is a sectional view acquired by sectioning the camera 1 on a YZ plane formed by a Y axis and a Z axis shown in FIG. 1A, and shows a rough internal configuration of the camera 1.

The image-capturing lens unit 1A includes two lenses 101, 102, an aperture 111, an aperture-driving unit 112, a lens-driving motor 113, a lens-driving member 114, a photocoupler 115, a pulse board 116, a mount contact 117, a focus adjustment circuit 118, and so on. The lens-driving member 114 is constituted by a drive gear and so on, and the photocoupler 115 detects rotation of the pulse board 116, which moves in conjunction with the lens-driving member 114, and transmits the detected rotation to the focus adjustment circuit 118. The focus adjustment circuit 118 moves the lens 101 by driving the lens-driving motor 113 on the basis of information from the photocoupler 115 and information (information indicating a lens drive amount) from the camera housing 1B, and in so doing modifies the focus position. The mount contact 117 is an interface between the image-capturing lens unit 1A and the camera housing 1B. Note that for simplicity, the two lenses 101, 102 are shown, but in actuality, the image-capturing lens unit 1A includes more than two lenses.

An image sensor 2, a CPU 3, a memory unit 4, a display device 10, a display device drive circuit 11, and so on are provided in the camera housing 1B. The image sensor 2 is disposed on a planned image formation plane of the image-capturing lens unit 1A. The CPU 3 is a central processing unit of a microcomputer for controlling the entire camera 1. The memory unit 4 stores images captured by the image sensor 2 and so on. The display device 10 is formed from liquid crystal or the like, and displays captured images (object images) and the like on a screen (a display surface) of the display device 10. The display device drive circuit 11 drives the display device 10.

Figure 3:
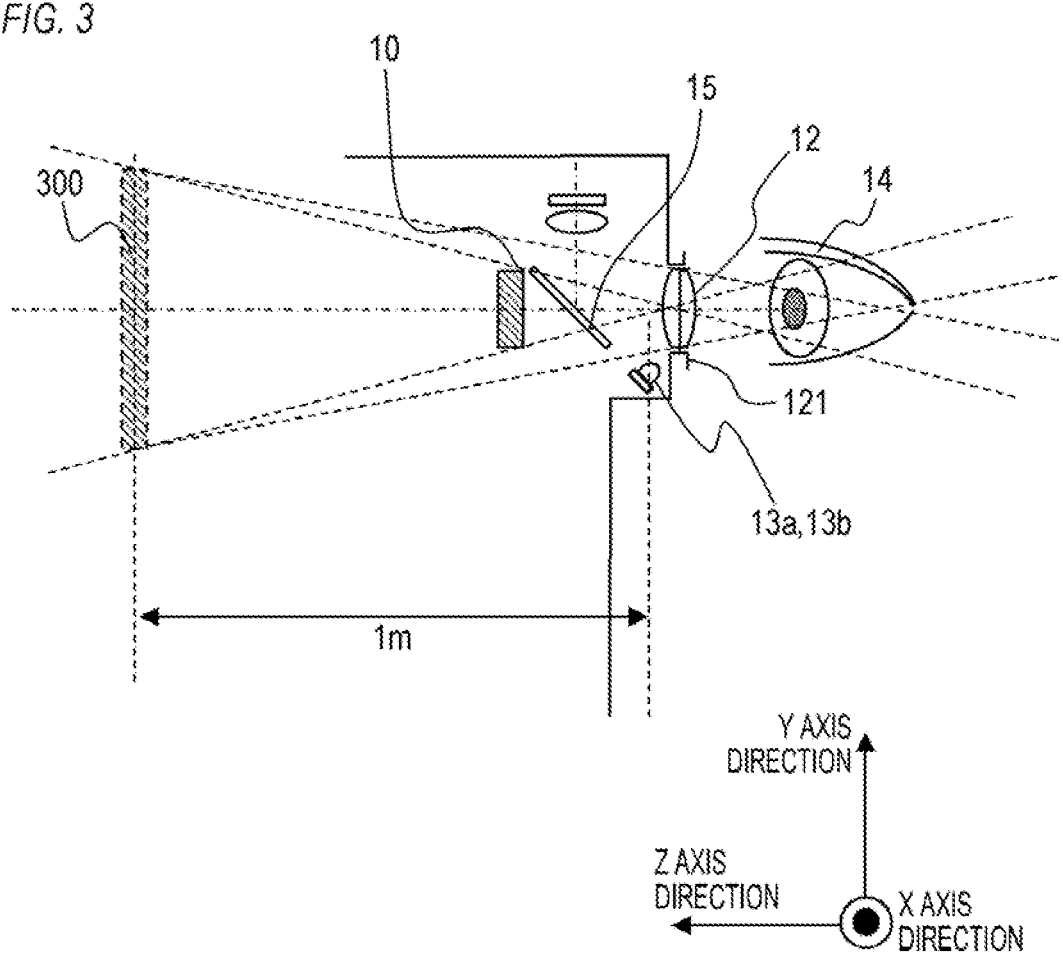
FIG. 3 is a view illustrating formation of a virtual image according to the first embodiment.

The user can view the screen of the display device 10 through the eyepiece window frame 121 and the eyepiece lens 12. More specifically, as shown in FIG. 3, a virtual image 300 acquired by enlarging the display device 10 (the screen) is formed by the eyepiece lens 12 in a position approximately 50 cm to 2 m away from the eyepiece lens 12. In FIG. 3, the virtual image 300 is formed in a position 1 m away from the eyepiece lens 12. The user views the virtual image 300 by looking through the eyepiece window frame 121.

Light sources 13a, 13b, an optical splitter 15, a light-receiving lens 16, an eye image sensor 17, and so on are also provided in the camera housing 1B. The light sources 13a, 13b are light sources used conventionally in a single-lens reflex camera or the like in order to detect a visual line direction from a relationship between the pupil and a reflection image (a corneal reflection image) generated by corneal reflection of light, and are used to illuminate an eyeball 14 of the user. More specifically, the light sources 13a, 13b are infrared light-emitting diodes or the like that emit infrared light not sensed by the user, and are disposed around the eyepiece lens 12. An optical image of the illuminated eyeball 14 (an eyeball image; an image generated by reflection light emitted from the light sources 13a, 13b and reflected by the eyeball 14) passes through the eyepiece lens 12 and is reflected by the optical splitter 15. An eyeball image is then formed by the light-receiving lens 16 on the eye image sensor 17, which is constituted by a two-dimensional array of photoelectric elements, such as a CCD. The light-receiving lens 16 positions the pupil of the eyeball 14 and the eye image sensor 17 in a conjugate image-forming relationship. Using a predetermined algorithm, to be described below, the visual line direction of the eyeball 14 (the viewed point on the screen of the display device 10) is detected from the position of the corneal reflection image on the eyeball image formed on the eye image sensor 17.

Figure 4:
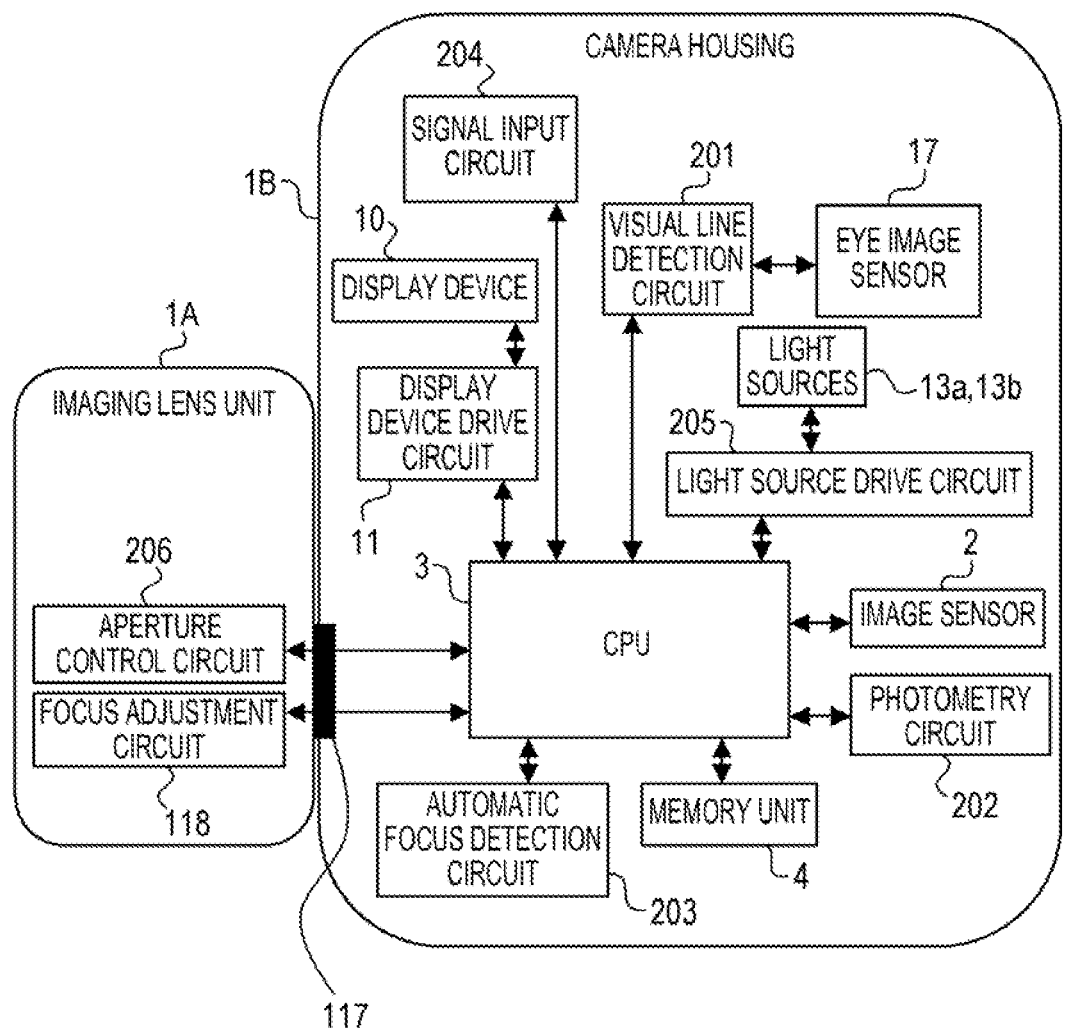
FIG. 4 is a block diagram of the camera according to the first embodiment.

FIG. 4 is a block diagram showing an electrical configuration inside the camera 1. A visual line detection circuit 201, a photometry circuit 202, an automatic focus detection circuit 203, a signal input circuit 204, the display device drive circuit 11, a light source drive circuit 205, and so on are connected to the CPU 3. Further, the CPU 3 transmits signals to the focus adjustment circuit 118, which is disposed in the image-capturing lens unit 1A, and an aperture control circuit 206, which is included in the aperture-driving unit 112 in the image-capturing lens unit 1A, through the mount contact 117. The memory unit 4 attached to the CPU 3 has a function for storing image-capturing signals from the image sensor 2 and the eye image sensor 17, and a function for storing visual line correction parameters for correcting individual visual line differences, to be described below.

The visual line detection circuit 201 subjects the output (an eye image of the eye) of the eye image sensor 17 (the CCD-EYE) in a state where an eyeball image is formed on the eye image sensor 17 to A/D conversion, and transmits the result to the CPU 3. The CPU 3 extracts characteristic points required to detect the visual line from the eye image in accordance with a predetermined algorithm, to be described below, and calculates the visual line of the user (the viewed point on the screen of the display device 10) from the positions of the characteristic points.

The photometry circuit 202 subjects a signal acquired from the image sensor 2, which doubles as a photometry sensor, or more specifically a brightness signal corresponding to the brightness of the field, to amplification, logarithmic compression, A/D conversion, and so on, and transmits the result to the CPU 3 as field brightness information.

The automatic focus detection circuit 203 subjects signal voltages from a plurality of detection elements (a plurality of pixels) included in the CCD of the image sensor 2 and used to detect phase differences to A/D conversion, and transmits the result to the CPU 3. The CPU 3 calculates the distance to an object corresponding to each focus detection point from the signals from the plurality of detection elements. This is a well-known technique known as image plane phase difference AF. In the first embodiment, as an example, it is assumed that focus detection points are provided respectively in 180 locations on the image plane, corresponding to 180 locations in a viewfinder viewed field (the screen of the display device 10) shown in FIG. 5A.

A switch SW1 that is switched ON by a first stroke of the release button 5 in order to start photometry, distance measurement, a visual line detection operation, and so on in the camera 1, and a switch SW2 that is switched ON by a second stroke of the release button 5 in order to start an imaging operation are connected to the signal input circuit 204. ON signals from the switches SW1, SW2 are input into the signal input circuit 204 and transmitted to the CPU 3.

Figure 5A:
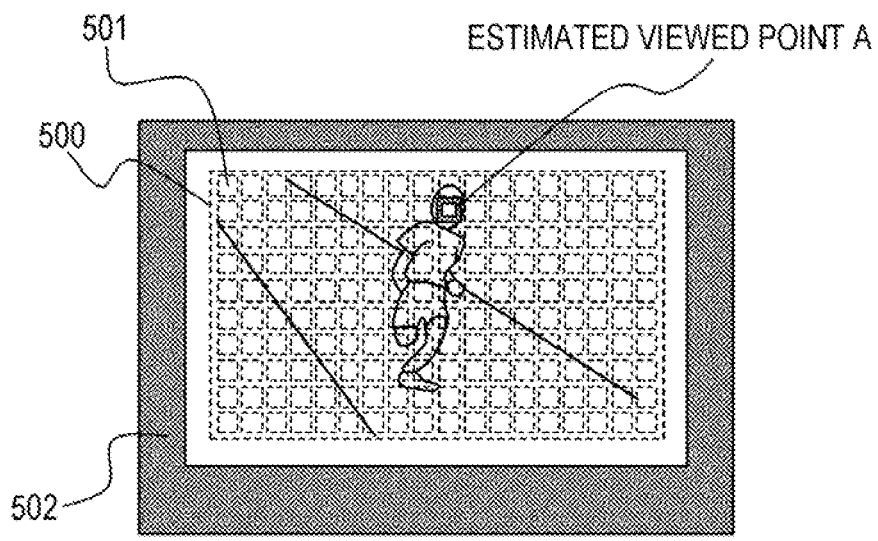
FIGS. 5A to 5C are views showing a viewfinder viewed field according to the first embodiment.

FIG. 5A is a view showing the viewfinder viewed field in a state where the display device 10 is operative (a state in which an image is displayed). As shown in FIG. 5A, the viewfinder viewed field includes a focus detection region 500, 180 distance measurement point indicators 501, a viewed field mask 502, and so on. Each of the 180 distance measurement point indicators 501 is displayed so as to be superimposed on a through image (a live-view image) displayed on the display device 10 so as to be displayed in a position corresponding to a focus detection point on the image plane. Further, of the 180 distance measurement point indicators 501, the distance measurement point indicator 501 corresponding to a current viewed point A (estimated position) is displayed in emphasis by a frame or the like.

Description of Visual Line Detection Operation

Figure 6:
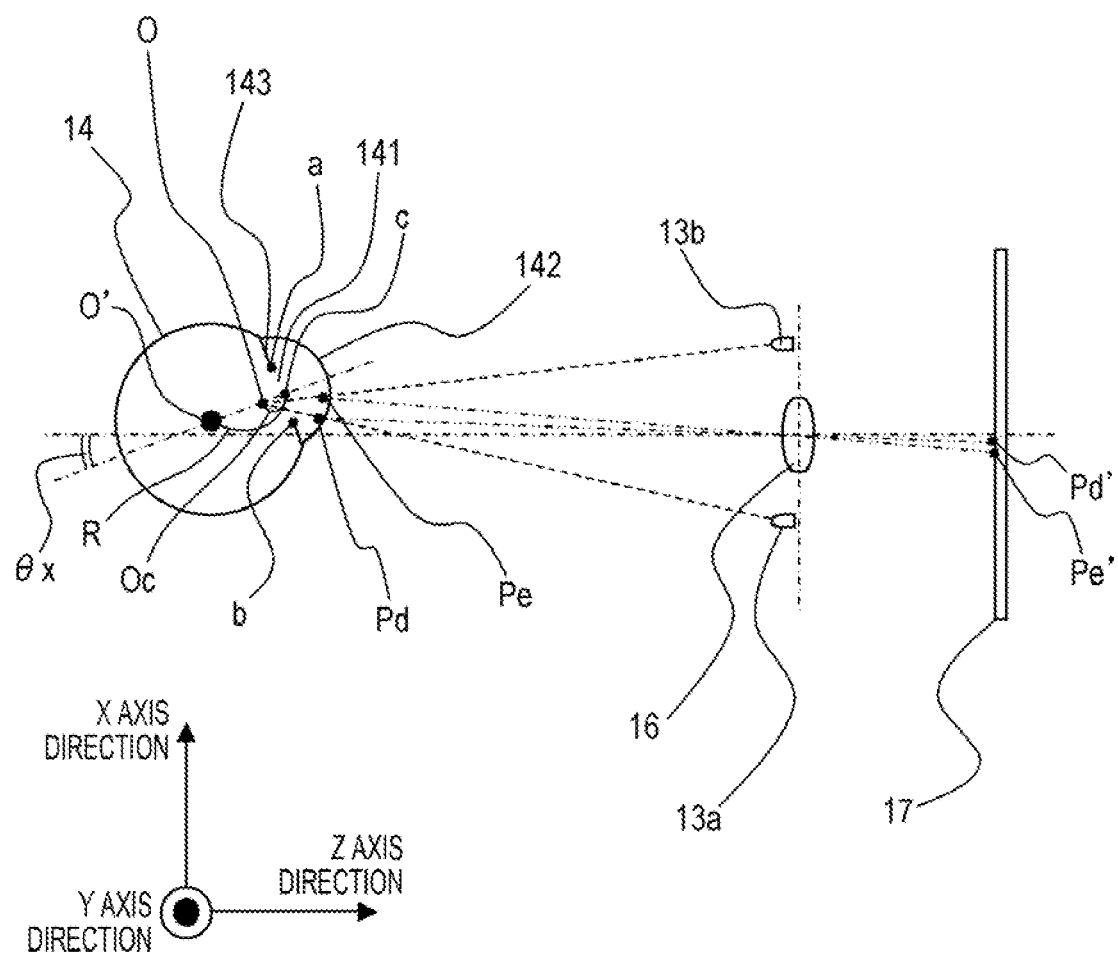
FIG. 6 is a view illustrating a principle of a viewed field detection method according to the first embodiment.
Figure 7A:
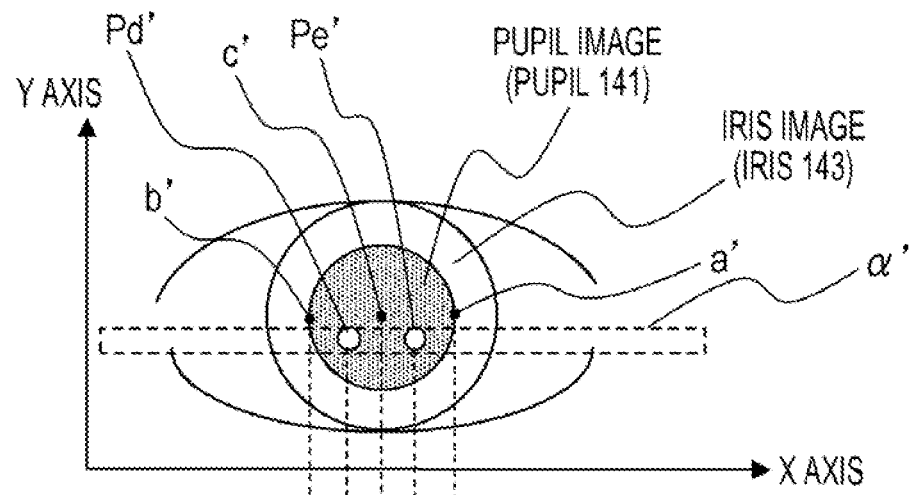
FIG. 7A is a view showing an eye image according to the first embodiment.
Figure 7B:
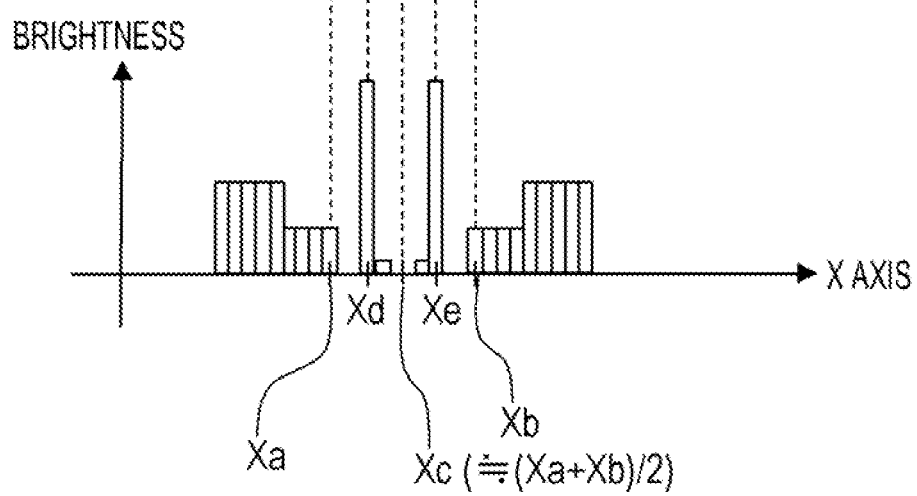
FIG. 7B is a view showing the output strength of an eye image sensor according to the first embodiment.
Figure 8:
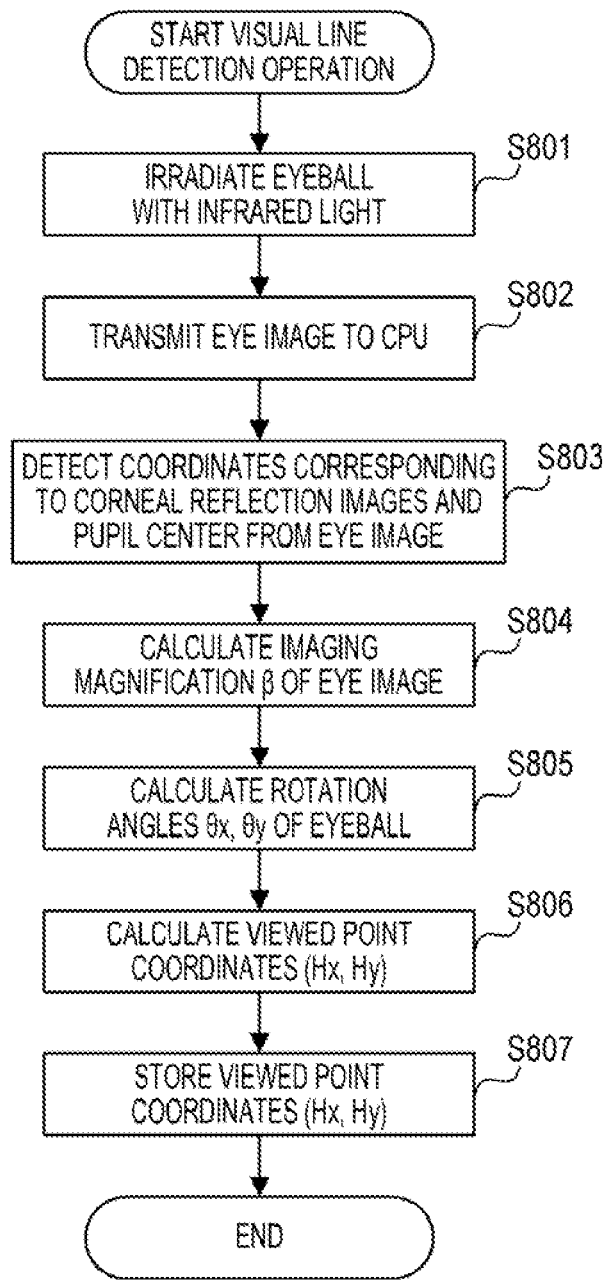
FIG. 8 is a flowchart of a visual line detection operation according to the first embodiment.

Using FIGS. 6, 7A, 7B, and 8, a visual line detection method will be described. FIG. 6 is a view illustrating a principle of the visual line detection method and a schematic view of an optical system used for visual line detection. As shown in FIG. 6, the light sources 13a, 13b are arranged substantially symmetrically about an optical axis of the light-receiving lens 16 in order to illuminate the eyeball 14 of the user. A part of the light that is emitted from the light sources 13a, 13b and reflected by the eyeball 14 is condensed on the eye image sensor 17 by the light-receiving lens 16. FIG. 7A is a schematic view of an eye image captured by the eye image sensor 17 (an eye image projected onto the eye image sensor 17), and FIG. 7B is a view illustrating the output strength of the CCD provided in the eye image sensor 17. FIG. 8 is a schematic flowchart of the visual line detection operation.

When the visual line detection operation starts, in step S801 in FIG. 8, the light sources 13a, 13b emit infrared light toward the eyeball 14 of the user. An image of the user's eyeball, illuminated by the infrared light, is formed on the eye image sensor 17 via the light-receiving lens 16 and subjected to photoelectric conversion by the eye image sensor 17. As a result, a processable electrical signal of the eye image is acquired.

In step S802, the visual line detection circuit 201 transmits the eye image (an eye image signal; the electrical signal of the eye image) acquired from the eye image sensor 17 to the CPU 3.

In step S803, the CPU 3 determines, from the eye image acquired in step S802, coordinates of points on the light sources 13a, 13b that correspond to corneal reflection images Pd, Pe and a pupil center c.

The infrared light emitted by the light sources 13a, 13b illuminates the cornea 142 of the eyeball 14 of the user. At this time, the corneal reflection images Pd, Pe formed by a part of the infrared light reflected by the surface of the cornea 142 are condensed by the light-receiving lens 16 and formed on the eye image sensor 17 so as to form corneal reflection images Pd', Pe' on the eye image. Similarly, luminous flux from edges a, b of the pupil 141 is formed into images on the eye image sensor 17 so as to form pupil edge images a', b' on the eye image.

FIG. 7B shows brightness information (a brightness distribution) relating to a region α' on the eye image of FIG. 7A. FIG. 7B shows the brightness distribution in an X axis direction, where a horizontal direction of the eye image is set as the X axis direction and a vertical direction is set as a Y axis direction. In the first embodiment, the coordinates of the corneal reflection images Pd', Pe' in the X axis direction (the horizontal direction) are set as Xd, Xe, and the coordinates of the pupil edge images a', b' in the X axis direction are set as Xa, Xb. As shown in FIG. 7B, at the coordinates Xd, Xe of the corneal reflection images Pd', Pe', extremely high brightness levels are acquired. In a region extending from the coordinate Xa to the coordinate Xb, which corresponds to the region of the pupil 141 (the region of the pupil image acquired when luminous flux from the pupil 141 is formed into an image on the eye image sensor 17), extremely low brightness levels are acquired except at the coordinates Xd, Xe. In a region of the iris 143 on the outside of the pupil 141 (a region of an iris image on the outside of the pupil image, which is acquired when luminous flux from the iris 143 is formed into an image), an intermediate brightness between the two types of brightness described above is acquired. More specifically, in a region in which the X coordinate (the coordinate in the X axis direction) is smaller than the coordinate Xa and a region in which the X coordinate is larger than the coordinate Xb, an intermediate brightness between the two types of brightness described above is acquired.

From a brightness distribution such as that shown in FIG. 7B, it is possible to acquire the X coordinates Xd, Xe of the corneal reflection images Pd', Pe' and the X coordinates Xa, Xb of the pupil edge images a', b'. More specifically, the coordinates at which the brightness is extremely high can be acquired as the coordinates of the corneal reflection images Pd', Pe', and the coordinates at which the brightness is extremely low can be acquired as the coordinates of the pupil edge images a', b'. Further, when a rotation angle θx of the optical axis of the eyeball 14 relative to the optical axis of the light-receiving lens 16 is small, a coordinate Xc of a pupil center image c' (the center of the pupil image) acquired when luminous flux from the pupil center c is formed into an image on the eye image sensor 17 can be expressed as Xc≈(Xa+Xb)/2. In other words, the coordinate Xc of the pupil center image c' can be calculated from the X coordinates Xa, Xb of the pupil edge images a', b'. The coordinates of the corneal reflection images Pd', Pe' and the coordinates of the pupil center image c' can thus be estimated.

In step S804, the CPU 3 calculates an imaging magnification β of the eyeball image. The imaging magnification β is a magnification determined from the position of the eyeball 14 relative to the light-receiving lens 16, and can be determined using a function of an interval (Xd-Xe) between the corneal reflection images Pd', Pe'.

In step S805, the CPU 3 calculates the rotation angle of the optical axis of the eyeball 14 relative to the optical axis of the light-receiving lens 16. The X coordinate of a center point between the corneal reflection image Pd and the corneal reflection image Pe and the X coordinate of a curvature center O of the cornea 142 substantially match. Therefore, when a standard distance from the curvature center O of the cornea 142 to the center c of the pupil 141 is set as Oc, the rotation angle θx of the eyeball 14 in a Z-X plane (a perpendicular plane to the Y axis) can be calculated using formula 1, shown below. A rotation angle θy of the eyeball 14 in a Z-Y plane (a perpendicular plane to the X axis) can be calculated by a similar method to the method for calculating the rotation angle θx.

$$\beta \times Oc \times \text{SIN } \theta x \approx \{(Xd+Xe)/2\} - Xc \quad \text{(formula 1)}$$

In step S806, the CPU 3 determines (estimates) the viewed point of the user (the position on which the visual line is focused; the position at which the user is looking) on the screen of the display device 10 using the rotation angles θx, θy calculated in step S805. Assuming that coordinates (Hx, Hy) of the viewed point are coordinates corresponding to the pupil center c, the coordinates (Hx, Hy) of the viewed point can be calculated using formulae 2 and 3, shown below.

$$Hx = m \times (Ax \times \theta x + Bx) \quad \text{(formula 2)}$$

$$Hy = m \times (Ay \times \theta y + By) \quad \text{(formula 3)}$$

A parameter m in formulae 2 and 3 is a constant determined by the configuration of the viewfinder optical system (the light-receiving lens 16 and so on) of the camera 1, and a conversion coefficient for converting the rotation angles θx, θy into coordinates corresponding to the pupil center c on the screen of the display device 10. The parameter m is determined in advance and stored in the memory unit 4. Parameters Ax, Bx, Ay, By are visual line correction parameters for correcting individual visual line differences, and are acquired by performing a calibration operation to be described below. The parameters Ax, Bx, Ay, By are stored in the memory unit 4 before the start of the visual line detection operation.

In step S807, the CPU 3 stores the viewed point coordinates (Hx, Hy) in the memory unit 4 and terminates the visual line detection operation.

Description of Calibration Operation

As described above, the viewed point can be estimated during the visual line detection operation by acquiring the rotation angles θx, θy of the eyeball 14 from the eye image and coordinate-converting the position of the pupil center c into a position on the screen of the display device 10.

Figure 5B:
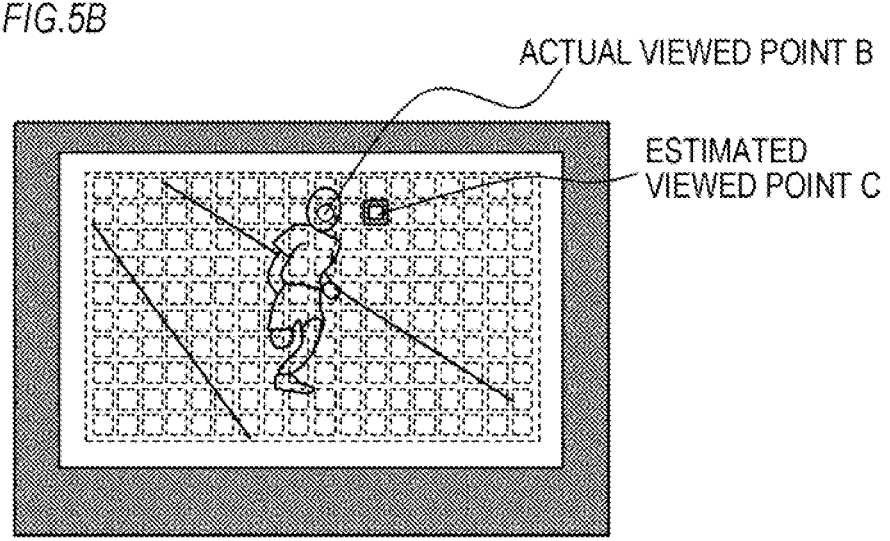

However, it may be impossible to detect the viewed point with a high degree of precision due to factors such as individual differences in the shape of human eyeballs. More specifically, as shown in FIG. 5B, unless the visual line correction parameters Ax, Ay, Bx, By are adjusted to appropriate values for the user, an actual viewed point B may deviate from an estimated viewed point C. In FIG. 5B, the user is focusing on a person, but the camera 1 estimates mistakenly that the user is focusing on the background, and as a result, appropriate focus detection and adjustment become impossible.

Hence, before the camera 1 performs image capture, it is necessary to perform a calibration operation to acquire appropriate viewed point correction parameters for the user and store the acquired parameters in the camera 1.

Figure 5C:
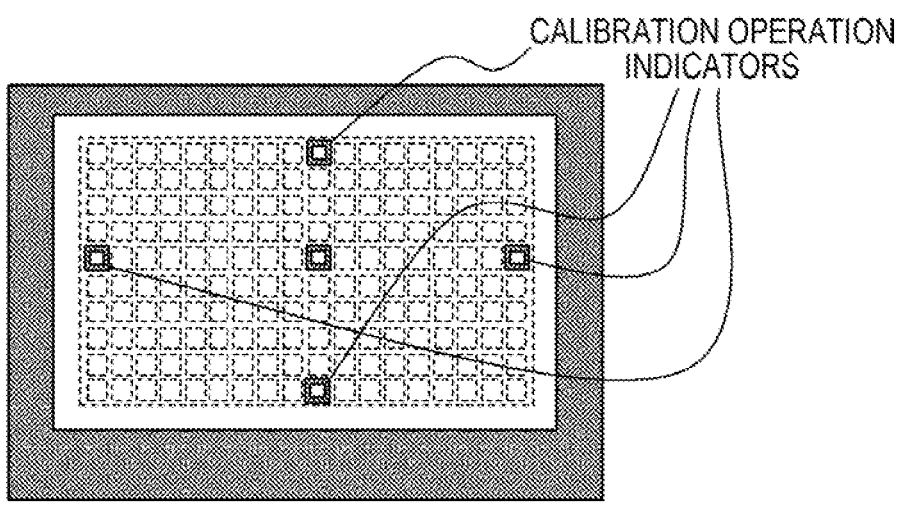

Conventionally, the calibration operation is performed before image capture by displaying a plurality of indicators in different positions, as shown in FIG. 5C, in emphasis on the screen of the display device 10 and having the user look at the indicators. Then, in a well-known technique, the visual line detection operation is performed with the user focusing on each indicator, and appropriate viewed point correction parameters for the user are determined from the calculated plurality of viewed points (estimated positions) and the coordinates of the respective indicators. Note that as long as the positions at which the user is to look are suggested, there are no particular limitations on the method of displaying the indicators, and graphics serving as the indicators may be displayed, or the indicators may be displayed by altering the brightness or color of the image (a captured image or the like).

Description of Viewing States in which User Looks Through Viewfinder after Performing Large Translational Motion of Head When the user looks through the viewfinder of the camera or the like, the user may, depending on circumstances such as wearing glasses, use the camera without bringing the eyeball close enough to the viewfinder. In a state where the eyeball has not been brought close enough to the viewfinder, the visual line may be blocked by the eyepiece window frame or the like, as described below, so that the visible range within the viewfinder is limited, and as a result, the edges of a screen inside the viewfinder may not be visible when looking through the viewfinder directly from the front. In this case, the user tends to move his/her head from directly in front of the viewfinder by a large translational motion in order to see the edges, with the result that the user looks through the viewfinder from an angle. The distance of the translational motion performed by the head when the user looks through the viewfinder from an angle is much larger than when the camera is used by a normal use method (as recommended by the manufacturer), and as a result, a non-negligible error occurs in the viewed point estimation result.

This look-through state will now be described using FIGS. 9A, 9B, 10A, and 10B. FIGS. 9A, 9B, 10A, and 10B are schematic plan views showing, from a Y axis positive direction, states in which the user views the virtual image 300 on the display device 10 (the screen) through the eyepiece window frame 121 and the eyepiece lens 12. For simplicity, the eyepiece lens 12 has been omitted from FIGS. 9A, 9B, 10A, and 10B. As described using FIG. 3, likewise in the states shown in FIGS. 9A, 9B, 10A, and 10B, the user is viewing the virtual image 300, which has been acquired by enlarging the display device 10 from its actual size using the eyepiece lens 12, not shown. Normally, the virtual image 300 is adjusted so as to be formed in a position approximately several tens of cm to 2 m away from the eyepiece lens 12. In FIGS. 9A, 9B, 10A, and 10B, the virtual image 300 is formed in a position 1 m away from the eyepiece lens 12 (not shown).

Figure 9A:
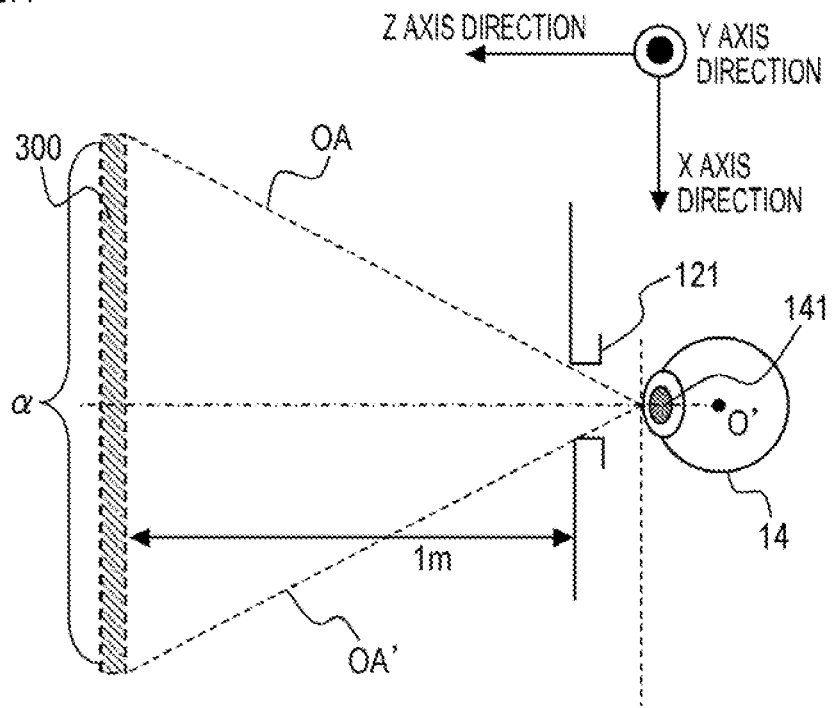
FIGS. 9A and 9B are views showing viewing states according to the first embodiment.

In FIG. 9A, the user is focusing substantially on the center of the virtual image 300 in a state where the center O' of the eyeball 14 is positioned in a position opposing the center of the virtual image 300 (the screen of the display device 10), i.e. a position through which the optical axis of the eyepiece lens 12 passes. The viewed field range of the eyeball 14 (the visible range through the eyepiece window frame 121) is determined by the width of the eyepiece window frame 121 and the like, and in FIG. 9A, a range α defined by a straight line OA and a straight line OA' passing through the pupil 141 of the eyeball 14 and the respective edges of the eyepiece window frame 121 is set as the viewed field range. In FIG. 9A, the entire virtual image 300 is included in the viewed field range α, and therefore the user can view the entire screen (from the edge on one side to the edge on the opposite side) of the display device 10.

Figure 9B:
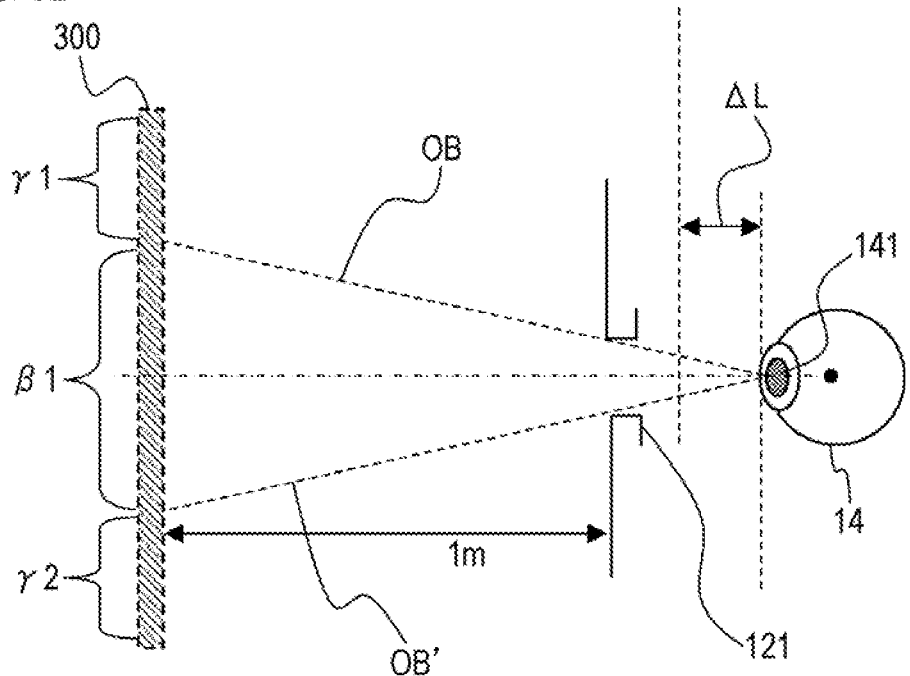

In FIG. 9B, however, due to circumstances such as glasses worn by the user being interposed between the eyeball 14 and the eyepiece window frame 121, the distance between the eyeball 14 and the eyepiece window frame 121 is larger than in FIG. 9A by a distance ΔL. In FIG. 9B, therefore, a viewed field range β1 defined by a straight line OB and a straight line OB' passing through the pupil 141 and the respective edges of the eyepiece window frame 121 is narrower than the viewed field range α of FIG. 9A. Accordingly, only a part of the virtual image 300 is included in the viewed field range β1, and as a result, the user cannot view ranges γ1, γ2 of the virtual image 300 (the edges of the virtual image 300), which are not included in the viewed field range β1.

Note that in the first embodiment, the eyepiece window frame 121 is cited as the factor limiting the viewed field range, but the factor is not limited thereto, and a mask that restricts light rays, for example, may be attached to the eyepiece lens 12 so that the viewed field range is limited thereby. The viewed field range may be limited by any structure (factor).

Actions frequently taken by the user in a situation such as that shown in FIG. 9B will now be described using FIGS. 10A and 10B.

Figure 10A:
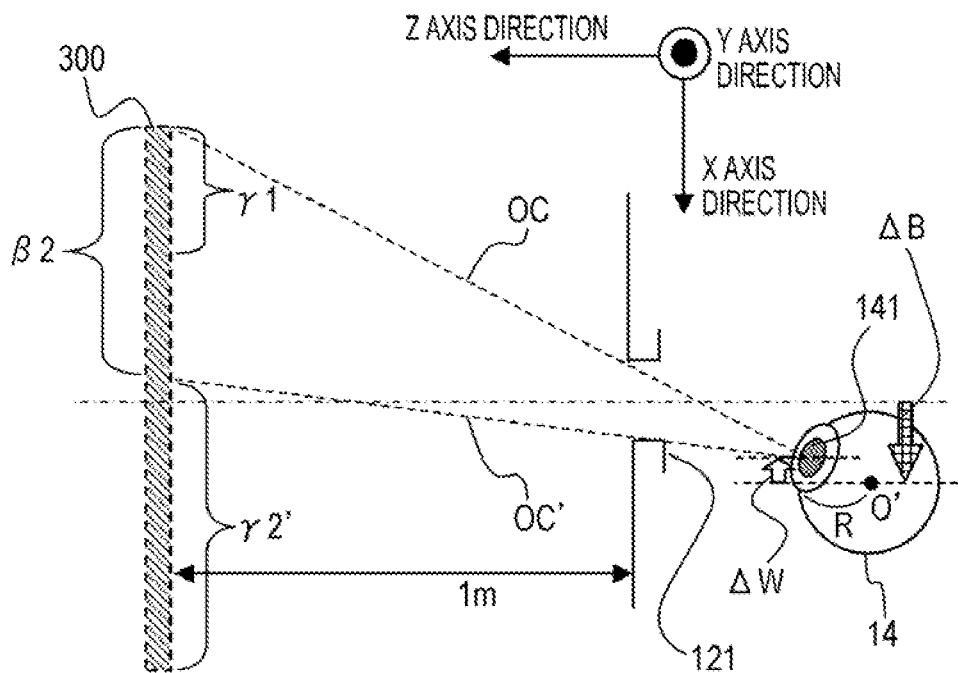
FIGS. 10A and 10B are views showing oblique look-through states according to the first embodiment.

When the user wishes to see the invisible range γ1 in the state shown in FIG. 9B, the user tends to move his/her entire head, including the eyeball 14, by a large translational motion in the X axis positive direction (a downward direction on the paper surface), as shown in FIG. 10A. As a result of this translational motion, the center O' of the eyeball 14 shifts in a perpendicular direction to the optical axis of the eyepiece lens 12 so that the viewed field range varies from the range β1 to a range β2 defined by a straight line OC and a straight line OC' passing through the shifted pupil 141 of the eyeball 14 and the respective edges of the eyepiece window frame 121. More specifically, the viewed field range moves in an X axis negative direction (an upward direction on the paper surface) so that the range β2, which includes the range γ1 that was invisible prior to the translational motion, becomes the viewed field range. As a result, the range γ1 becomes visible to the user. Note, however, that an invisible range in the downward direction of the paper surface is enlarged from the range γ2 to a range γ2'.

Figure 10B:
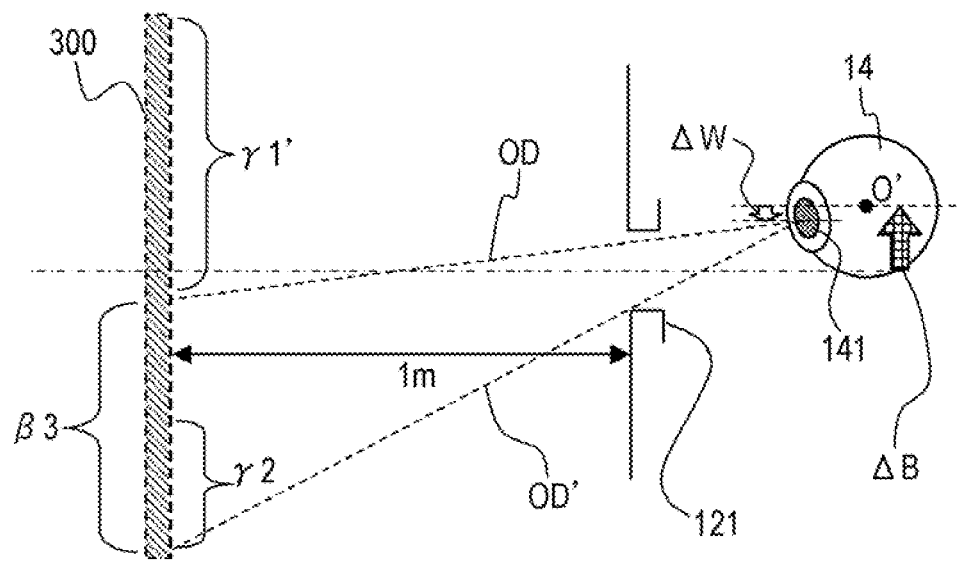

Similarly, when the user wishes to see the invisible range γ2 in the state shown in FIG. 9B, the user tends to move his/her entire head, including the eyeball 14, by a large translational motion in the X axis negative direction (the upward direction on the paper surface), as shown in FIG. 10B. As a result of this translational motion, the center O' of the eyeball 14 shifts in a perpendicular direction to the optical axis of the eyepiece lens 12 so that the viewed field range varies from the range β1 to a range β3 defined by a straight line OD and a straight line OD' passing through the shifted pupil 141 of the eyeball 14 and the respective edges of the eyepiece window frame 121. More specifically, the viewed field range moves in the X axis positive direction (the downward direction on the paper surface) so that the range β3, which includes the range γ2 that was invisible prior to the translational motion, becomes the viewed field range. As a result, the range γ2 becomes visible to the user. Note, however, that an invisible range in the upward direction of the paper surface is enlarged from the range γ1 to a range γ1'.

Figure 11A:
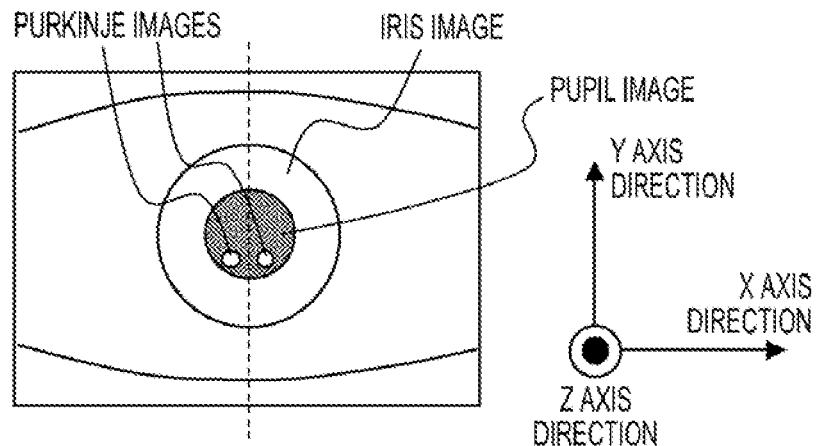
FIGS. 11A to 11C are views showing eye images according to the first embodiment.
Figure 11B:
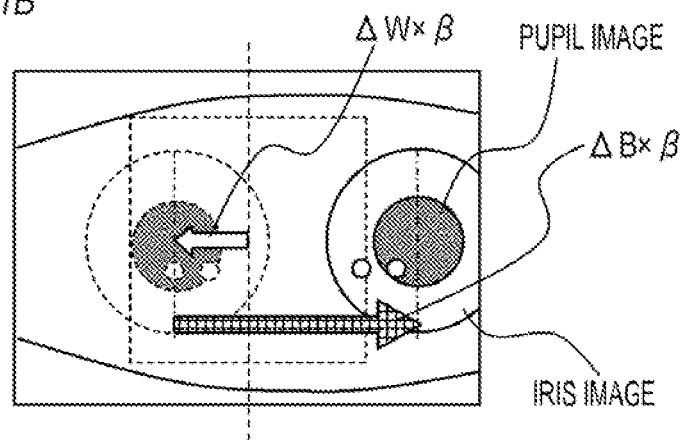
Figure 11C:
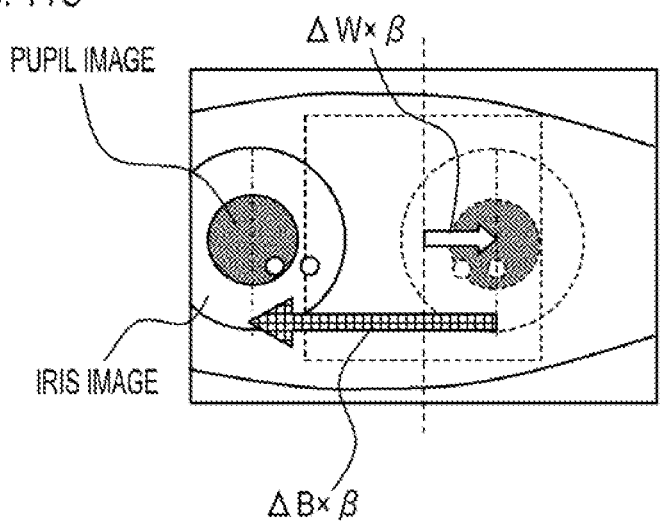

FIGS. 11A to 11C are schematic views of eye images (eyeball images) before and after the translational motions of the eyeball 14 described using FIGS. 10A and 10B.

FIG. 11A shows an eye image corresponding to the state shown in FIG. 9B, in which the user is focusing substantially on the center of the virtual image 300 with a position opposing the center of the virtual image 300 (the screen of the display device 10), i.e. a position through which the optical axis of the eyepiece lens 12 passes, being set as the center O' of the eyeball 14. In FIG. 11A, the center of the pupil image and the respective centers of two Purkinje images (P images; corneal reflection images) substantially match the center of the eye image. In the first embodiment, the center of the eye image corresponds to the center of the screen of the display device 10, or more specifically to the optical axis of the eyepiece lens 12, but this need not be the case.

FIG. 11B shows an eye image corresponding to the state shown in FIG. 10A, in which the user is looking through the eyepiece window frame 121 after moving the eyeball 14 by a large translational motion in the X axis positive direction.

In FIG. 10A, in order to view the X axis negative direction edge, the center O' of the eyeball 14 has been moved translationally from the position of FIG. 9B by a movement amount ΔB in the X axis positive direction (the opposite direction to the direction the user wishes to see). Further, the eyeball 14 has been rotated in the X axis negative direction (the same direction as the direction the user wishes to see) so that the position of the pupil center c is moved from the eyeball center O' by a movement amount ΔW in the X axis negative direction. When the rotation angle of the eyeball 14 is set as an angle θt and a rotation radius of the eyeball 14 is set as a radius R, the movement amount ΔW of the pupil 141 can be expressed as ΔW=R×sin θt.

When the eyeball 14 moves as described using FIG. 10A, the pupil image and the Purkinje images move translationally on the eye image by a much larger movement amount than in a normal viewing state (the viewing state recommended by the manufacturer; for example, a viewing state in which the user looks through the viewfinder directly from the front). More specifically, when the eyeball 14 rotates in the X axis negative direction so that the pupil 141 moves by the movement amount ΔW, the pupil image moves in the X axis negative direction by a movement amount ΔW×β (where "β" is the imaging magnification of the eyeball image (the lens magnification of the eyepiece lens 12)). Further, when the eyeball 14 moves translationally in the X axis positive direction by the movement amount ΔB, the pupil image moves translationally in the X axis positive direction by a movement amount ΔB×β. Here, the movement amount ΔB×β corresponding to the translational motion of the eyeball 14 greatly exceeds the movement amount ΔW×β corresponding to the rotation of the eyeball 14. As a result, as shown in FIG. 11B, the pupil image is positioned in a location far removed from the center of the eye image (a position corresponding to the center of the screen of the display device 10) in the X axis positive direction (a rightward direction on the paper surface), i.e. the opposite direction to the X axis negative direction (the same direction as the direction the user wishes to see; a leftward direction on the paper surface). The Purkinje images likewise perform large translational motions.

FIG. 11C shows an eye image corresponding to the state shown in FIG. 10B, in which the user is looking through the eyepiece window frame 121 after moving the eyeball 14 by a large translational motion in the X axis negative direction.

In FIG. 10B, in order to view the X axis positive direction edge, the center O' of the eyeball 14 has been moved translationally from the position of FIG. 9B by the movement amount ΔB in the X axis negative direction (the opposite direction to the direction the user wishes to see). Further, the eyeball 14 has been rotated in the X axis positive direction (the same direction as the direction the user wishes to see) so that the position of the pupil center c is moved from the eyeball center O' by the movement amount ΔW in the X axis positive direction. As described above, when the rotation angle of the eyeball 14 is set as the angle θt and the rotation radius of the eyeball 14 is set as the radius R, the movement amount ΔW of the pupil 141 can be expressed as ΔW=R×sin θt.

Likewise when the eyeball 14 moves as described using FIG. 10B, the pupil image and the Purkinje images move translationally on the eye image by a much larger movement amount than in the normal viewing state. More specifically, when the eyeball 14 rotates in the X axis positive direction so that the pupil 141 moves by the movement amount ΔW, the pupil image moves in the X axis positive direction by the movement amount ΔW×β. Further, when the eyeball 14 moves translationally in the X axis negative direction by the movement amount ΔB, the pupil image moves translationally in the X axis negative direction by the movement amount ΔB×β. Here also, the movement amount ΔB×β corresponding to the translational motion of the eyeball 14 greatly exceeds the movement amount ΔW×β corresponding to the rotation of the eyeball 14. As a result, as shown in FIG. 11C, the pupil image is positioned in a location far removed from the center of the eye image (a position corresponding to the center of the screen of the display device 10) in the X axis negative direction (the leftward direction on the paper surface), i.e. the opposite direction to the X axis positive direction (the same direction as the direction the user wishes to see; the rightward direction on the paper surface). The Purkinje images likewise perform large translational motions.

Hence, in viewing states where the user looks through the viewfinder from an angle, the pupil image and the Purkinje images on the eye image are positioned in locations not envisaged in the normal viewing state. As a result, a non-negligible error occurs in the viewed point estimation result acquired in the visual line detection operation of FIG. 8.

Therefore, in the first embodiment, an oblique look-through state (a viewing state in which the user looks through the viewfinder from an angle; a viewing state in which the viewed point cannot be estimated with a high degree of precision; a shifted viewing state in which the eyeball 14 shifts from a position corresponding to the center of the screen of the display device 10 on the eye image) is detected. When an oblique look-through state is detected, predetermined processing is performed to prompt the user to look through the viewfinder directly from the front rather than looking through the viewfinder from an angle.

Description of Oblique Look-Through Detection Method

A first characteristic of an oblique look-through state in which the edges of the screen (the virtual image) of the display device 10 does not fit into the viewed field of the user so that the user attempts to look at the edges is that the distance from the center of the eye image to the pupil image on the eye image is much larger than in the normal viewing state. Hence, in the first embodiment, a determination is made as to whether or not a first condition, namely that a difference between the center of the eye image (a position corresponding to the center of the screen of the display device 10) and the position of the pupil image on the eye image is greater than a predetermined threshold, is satisfied. A state in which the first condition is satisfied is then detected as the oblique look-through state.

The predetermined threshold is determined, for example, from the amount of movement of the pupil image that can occur on the eye image in the normal viewing state. When looking at the edges of the screen of the display device 10 in the normal viewing state, only the eyeball is rotated, while the head remains substantially motionless. Hence, a maximum movement amount $\beta \times R \times \sin \theta max$ of the pupil image on the eye image can be calculated from a maximum rotation angle $\theta max$ of the eyeball 14, the rotation radius R of the eyeball 14 (a length from the eyeball center O' to the pupil center c in FIG. 6), and the imaging magnification $\beta$ of the eyeball image. This maximum movement amount $\beta \times R \times \sin \theta max$ can be used as the aforesaid predetermined threshold, for example.

Note that the first condition may focus on the Purkinje images on the eye image rather than the pupil image on the eye image. More specifically, a determination may be made as to whether or not a first condition, namely that differences between the center of the eye image and the positions of the Purkinje images on the eye image are greater than a predetermined threshold, is satisfied, and a state in which the first condition is satisfied may be detected as the oblique look-through state. The first condition may focus on either the pupil image or the Purkinje images, or both. A state in which either the first condition relating to the pupil image is satisfied or the first condition relating to the Purkinje images is satisfied may be detected as the oblique look-through state, or a state in which both are satisfied may be detected as the oblique look-through state.

Description of Camera Operation

A camera operation according to the first embodiment will now be described in accordance with a flowchart shown in FIG. 12.

When a power supply of the camera 1 is switched ON, in step S1201, the image sensor 2 starts to acquire a through image (a viewing image) and transmits an image signal of the through image to the CPU 3, whereupon the CPU 3 displays the acquired through image on the display device 10. The user confirms the object by looking at the through image displayed on the display device 10 through the eyepiece window frame 121 and the eyepiece lens 12. The power supply of the camera 1 is switched ON and OFF in response to user operations on the camera 1.

In step S1202, the CPU 3 determines whether or not the power supply of the camera 1 is OFF. The CPU 3 terminates the processing flow of FIG. 12 when the power supply is OFF and advances the processing to step S1203 when the power supply is not OFF.

In step S1203, the CPU 3 starts to acquire an eye image of the user who started to view the through image in step S1201, and performs the visual line detection operation of FIG. 8. In the visual line detection operation, the coordinates of the pupil image on the eye image, the coordinates of the Purkinje images on the eye image, and the coordinates of the viewed point on the through image are calculated.

In step S1204, the CPU 3 determines whether or not the first condition is satisfied, or more specifically whether or not the position of the pupil image, detected in the visual line detection operation of step S1203, is within a predetermined range. The predetermined range is a partial range of the eye image, extending from the center of the eye image to a position removed therefrom by the aforesaid predetermined threshold (predetermined distance). The CPU 3 advances the processing to step S1205 when the position of the pupil image is outside the predetermined range and advances the processing to step S1207 when the position of the pupil image is within the predetermined range.

In step S1205, the CPU 3 determines that the current state is the oblique look-through state. In step S1206, since the viewed point estimation result acquired during the visual line detection operation in step S1203 includes a non-negligible error, the CPU 3 performs processing (viewing state improvement processing) to eliminate the error (improve the viewing state). The processing is then returned to step S1203, where the visual line detection operation is performed again.

In the first embodiment, the CPU 3 issues the user with a predetermined notification such as a warning relating to the viewing state in the viewing state improvement processing. For example, since it can be estimated that a direction traveling from a position directly in front of the eyepiece window frame 121 toward the position of the head of the user is identical to a direction traveling from the center of the eye image toward the pupil image, the CPU 3 provides the user with direction information for moving his/her head in the opposite direction to these directions.

Note that the viewing state improvement processing is not limited to a predetermined notification, and as long as the user can be prompted to improve the viewing state (to look through the eyepiece window frame 121 directly from the front), for example, any processing may be performed as the viewing state improvement processing. More specifically, the viewing state improvement processing may consist of reducing the through image (the viewing image). By reducing the through image so that the edges of the through image are closer to the center of the screen of the display device 10, the user can view the entire through image without looking through the eyepiece window frame 121 from an angle, and as a result, the oblique look-through state can be eliminated.

The processing of step S1207 is performed after performing the visual line detection operation in S1203 in a favorable viewing state, i.e. not the oblique look-through state, and therefore, at the point of the processing of step S1207, an accurate viewed point estimation result is acquired. Accordingly, in step S1207, the CPU 3 displays the accurate estimation result (a frame indicating the viewed point; a viewed point frame) acquired in step S1203 so as to be superimposed on the through image. As a result, display is performed as shown in FIG. 5A, whereby the user can be notified of the current viewed point A (estimated position). Dots or the like indicating the viewed point may be displayed instead of a viewed point frame.

In step S1208, the CPU 3 waits for a predetermined time.

In step S1209, the CPU 3 determines whether or not the user has pressed (half-pressed) the release button 5 so as to switch the switch SW1 ON. For example, it is assumed that when the user consents to focus on the position of the viewed point frame (the frame indicating the estimated viewed point) displayed so as to be superimposed on the through image, the user switches the switch SW1 ON by half-pressing the release button 5. The CPU 3 advances the processing to step S1210 when the switch SW1 is ON and returns the processing to step S1203 in order to re-estimate the viewed point when the switch SW1 is not ON.

In step S1210, the CPU 3 performs an operation to measure the distance to the current position of the visual line frame and notifies the user that the distance measurement operation has been performed by displaying the visual line frame in emphasis, for example by changing the color thereof.

In step S1211, the CPU 3 drives the lens 101 in the image-capturing lens unit 1A in accordance with the distance measurement result acquired in step S1210. As a result, focusing is realized on the position of the viewed point frame displayed so as to be superimposed on the through image.

In step S1212, the CPU 3 determines whether or not the user has further pressed (fully pressed) the release button 5 so as to switch the switch SW2 ON. For example, it is assumed that when the user consents to perform image capture in the current focus position, the user switches the switch SW2 ON by fully pressing the release button 5. The CPU 3 advances the processing to step S1213 when the switch SW2 is ON and returns the processing to step S1209 when the switch SW2 is not ON.

In step S1213, the CPU 3 performs an image capture operation and stores an image signal acquired by the image sensor 2 in the memory unit 4.

In step S1214, the CPU 3 displays the image (the captured image) stored in the memory unit 4 in step S1213 on the display device 10 for a predetermined time and then returns the processing to step S1202.

Summary

According to the first embodiment, as described above, the oblique look-through state can be detected by the simple configuration of determining whether or not the first condition, namely that the difference between the center of the eye image and the position of the pupil image (or the Purkinje images) on the eye image is greater than a predetermined threshold, is satisfied. Further, when the oblique look-through state is detected, the user can be prompted to improve the viewing state, whereby an accurate (highly precise) viewed point estimation result can be acquired.

Second Embodiment

A second embodiment of the present invention will now be described. Note that below, description of the same points (configurations, processing, and so on) as in the first embodiment will be omitted, and points that differ from the first embodiment will be described. In the example described in the first embodiment, the oblique look-through state is detected while displaying the through image. In the second embodiment, an example in which the oblique look-through state is detected during the calibration operation will be described. Further, in the second embodiment, an example in which an image display range (the range in which an image is displayed) within the viewfinder is determined on the basis of the oblique look-through state detection result will be described. More specifically, an example in which the image display range of the display device 10 is determined on the basis of the oblique look-through state detection result so as to prompt the user to look through the viewfinder directly from the front instead of looking through the viewfinder from an angle will be described.

Figure 13A:
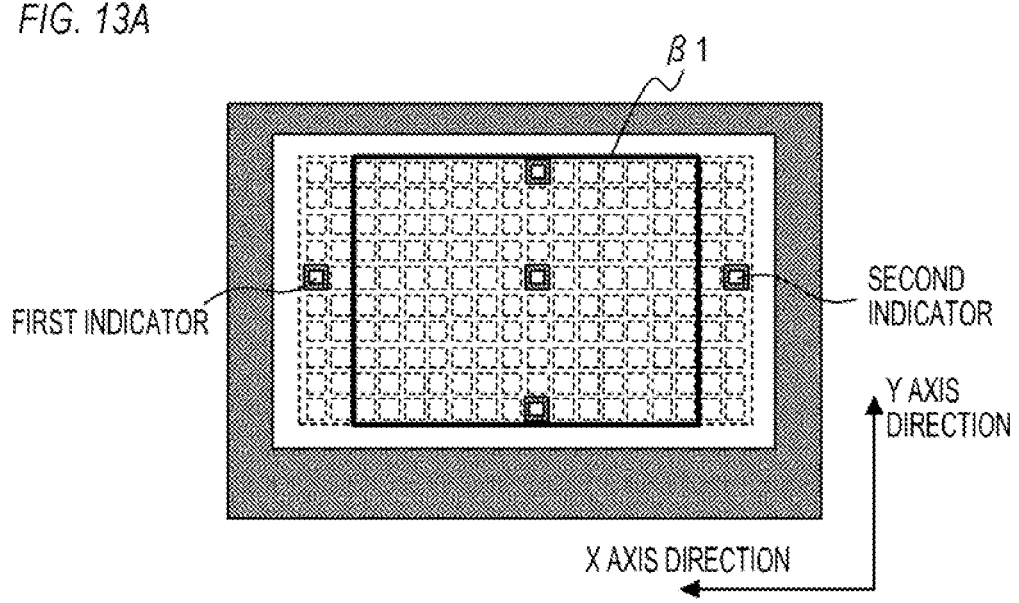
FIGS. 13A to 13C are views showing indicators according to a second embodiment.

As described above, the calibration operation is performed by displaying a plurality of indicators in different positions in emphasis on the screen of the display device 10 prior to image capture, and having the user look at the indicators. For example, as shown in FIG. 13A, indicators are displayed in five locations, namely in the center of the screen of the display device 10 and on the upper side, lower side, left side, and right side of the center. In the second embodiment, the indicators are displayed one at a time, but instead, all five indicators may be displayed, and the indicator displayed in emphasis, among the five indicators, may be switched in succession. The user then looks at the displayed indicator (the indicator displayed in emphasis). In other words, in the calibration operation, the position at which the user is to look is specified by the indicator.

During the calibration operation, in a state where the eyeball 14 is not close enough to the eyepiece window frame 121 so that a part of the screen of the display device 10 does not fit into the viewed field of the user, the user may be unable to view an indicator positioned at the edge of the screen. For example, in a viewed field range $\beta 1$ shown in FIG. 13A (a viewed field range corresponding to looking through the eyepiece window frame 121 directly from the front), the user can see indicators in three locations, namely the center, upper side, and lower side of the screen, but cannot see indicators in two locations, namely the left side and right side.

In this case, the user adopts the oblique look-through state in order to see the indicators outside the viewed field range $\beta 1$. In an oblique look-through state for looking at the left-side indicator (a first indicator) shown in FIG. 13A, an eye image such as that shown in FIG. 11C is acquired, and in an oblique look-through state for looking at the right-side indicator (a second indicator) shown in FIG. 13A, an eye image such as that shown in FIG. 11B is acquired.

The eye image of FIG. 11C will now be described. In order to see the first indicator on the left edge (the X axis positive direction edge) of the screen of the display device 10, the user moves his/her head translationally in the X axis negative direction (the opposite direction to the direction the user wishes to see; a rightward direction), as shown in FIG. 10B, and then looks through the eyepiece window frame 121. Accordingly, on the eye image of FIG. 11C, the pupil image and the Purkinje images are positioned on the opposite side (the X axis negative direction side) to the side of the first indicator (the X axis positive direction side).

The eye image of FIG. 11B will now be described. In order to see the second indicator on the right edge (the X axis negative direction edge) of the screen of the display device 10, the user moves his/her head translationally in the X axis positive direction (the opposite direction to the direction the user wishes to see; a leftward direction), as shown in FIG. 10A, and then looks through the eyepiece window frame 121. Accordingly, on the eye image of FIG. 11B, the pupil image and the Purkinje images are positioned on the opposite side (the X axis positive direction side) to the side of the second indicator (the X axis negative direction side).

Hence, on the eye image in the oblique look-through state, the pupil image and the Purkinje images are positioned on the opposite side to the side of the indicator that the user wishes to see.

Description of Oblique Look-Through Detection Method

As described above, a second characteristic of the oblique look-through state is that on the eye image, the pupil image is positioned on the opposite side to the side of the indicator that the user wishes to see. In the second embodiment, therefore, a second condition, namely that a direction traveling from the center of the eye image toward the pupil image on the eye image is opposite to a direction traveling from the center of the eye image toward an indicator-corresponding position (a position corresponding to the indicator to be seen) on the eye image, is used. Hence, the oblique look-through state can also be detected by the simple configuration of determining whether or not the second condition is satisfied. More specifically, a state in which the second condition is satisfied can be detected as the oblique look-through state. In the second embodiment, a determination is made as to whether or not the first condition described in the first embodiment and the second condition described above are both satisfied, and a state in which the first and second conditions are both satisfied is detected as the oblique look-through state. By using both the first condition and the second condition, the oblique look-through state can be detected with an even higher degree of precision than in the first embodiment. It is also possible to use only one of the first and second conditions.

Note that in the calibration operation, as described above, the position at which the user is to look is specified by an indicator. It may therefore be said that the second condition is a suitable condition for detecting the oblique look-through state during the calibration operation. However, as long as the position at which the user is to look is displayed in emphasis on the screen of the display device 10, the second condition can also be used favorably to detect the oblique look-through state at times other than during the calibration operation.

Note that similarly to the first condition, the second condition may focus on the Purkinje images on the eye image rather than the pupil image on the eye image. More specifically, a determination may be made as to whether or not a second condition, namely that directions traveling from the center of the eye image toward the Purkinje images on the eye image are opposite to the direction traveling from the center of the eye image toward the indicator-corresponding position on the eye image, is satisfied, and a state in which the second condition relating to the Purkinje images is satisfied may be detected as the oblique look-through state. The second condition may focus on either the pupil image or the Purkinje images, or both. A state in which either all of the conditions (the first and second conditions) relating to the pupil image or all of the conditions (the first and second conditions) relating to the Purkinje images are satisfied may be detected as the oblique look-through state. Alternatively, a state in which all of the conditions relating to the pupil image and all of the conditions relating to the Purkinje images are satisfied may be detected as the oblique look-through state. Further, a state in which a part of the conditions (either the first condition or the second condition) relating to the pupil image and the remainder of the conditions (the other of the first and second conditions) relating to the Purkinje images are satisfied may be detected as the oblique look-through state.

Note that in the example described in the second embodiment, the user adopts the oblique look-through state when unable to see the two indicators on the left and right sides of the screen of the display device 10, but the user may also adopt the oblique look-through state when unable to see the indicators on the upper side, the lower side, and so on of the screen of the display device 10. These oblique look-through states are likewise detected using the first and second conditions.

Description of Viewing State Improvement Method

As described above, the user adopts the oblique look-through state when the visual line of the user is blocked by the eyepiece window frame or the like so that the user cannot see the edges of the display device 10 (the screen). Hence, in the second embodiment, when the oblique look-through state is detected, the image display range of the display device 10 is set at a reduced range relative to the current range.

Figure 14A:
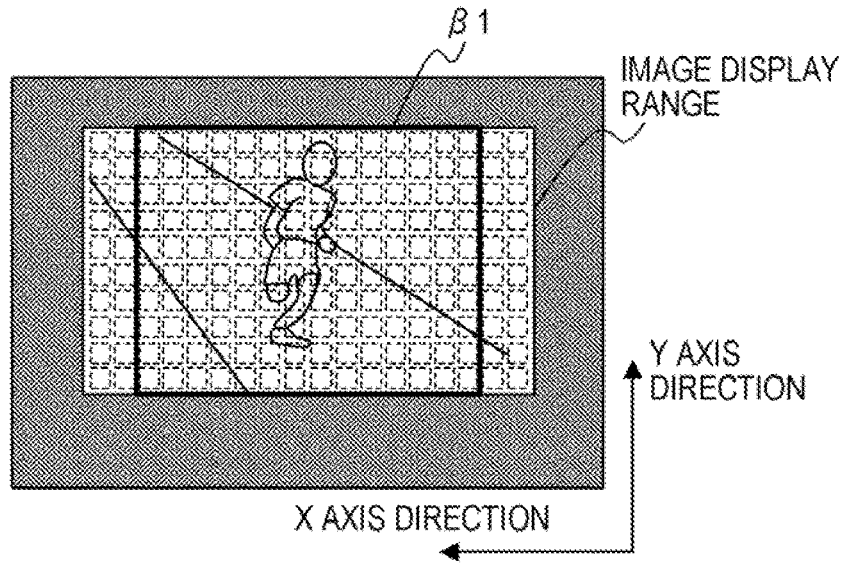
FIGS. 14A to 14C are views showing image displays according to the second embodiment.
Figure 15A:
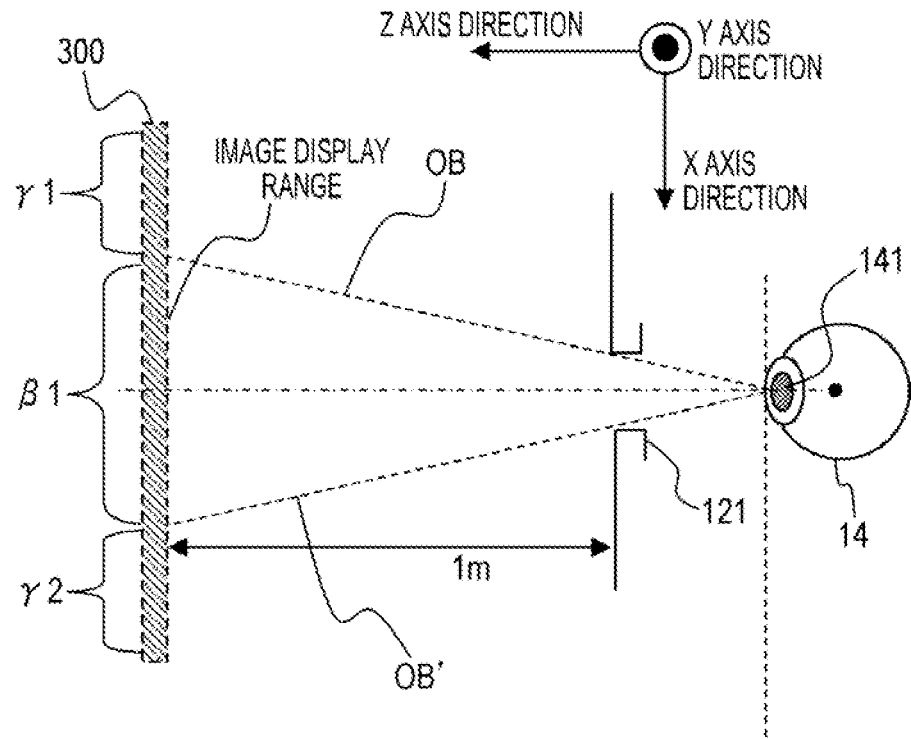
FIGS. 15A and 15B are views showing viewing states according to the second embodiment.

FIG. 14A shows an image display state before detecting the oblique look-through state. FIG. 15A is a schematic view of the viewing state at this time. The viewed field is limited by the eyepiece window frame 121 so that only a partial range β1 of the virtual image 300 on the display device 10 (the screen) is within the viewed field. Accordingly, the user cannot see partial ranges γ1, γ2 of the virtual image 300. In order to see the ranges γ1, γ2, the user adopts the oblique look-through state, and as a result, a non-negligible error occurs in the viewed point estimation result.

Figure 14B:
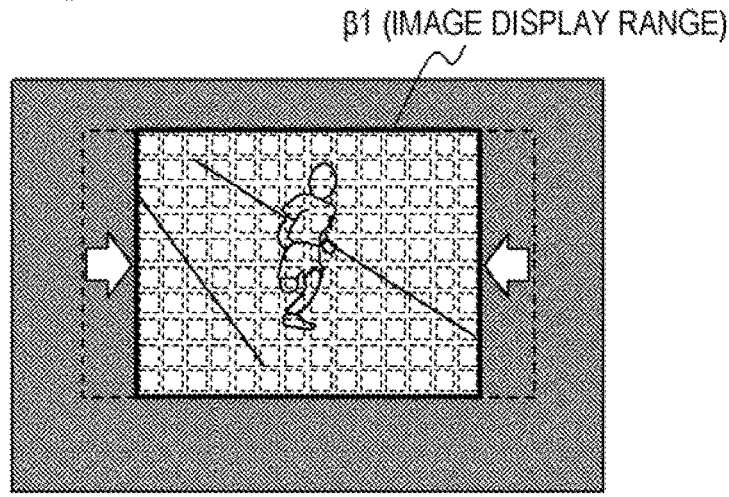
Figure 15B:
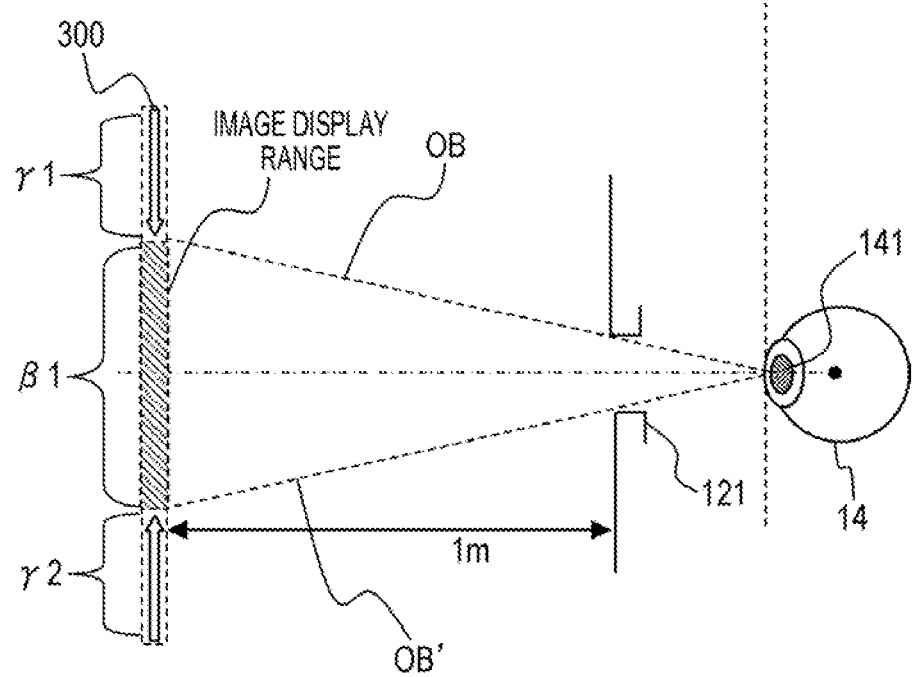

Hence, in the second embodiment, as shown in FIG. 14B, the image display range of the display device 10 is reduced to a range β1 that is visible to the user. FIG. 15B is a schematic view showing the viewing state following the reduction. Since the image display range is reduced to the range β1, which corresponds to the viewed field range of the user, the user can see the entire image displayed on the display device 10 without adopting the oblique look-through state. In other words, a situation in which it is not necessary to adopt the oblique look-through state (a situation in which it is not necessary to move the head translationally) can be created. The user can thus be prompted to improve the viewing state (eliminate the oblique look-through state), and as a result, an accurate (highly precise) viewed point estimation result can be acquired.

Figure 14C:
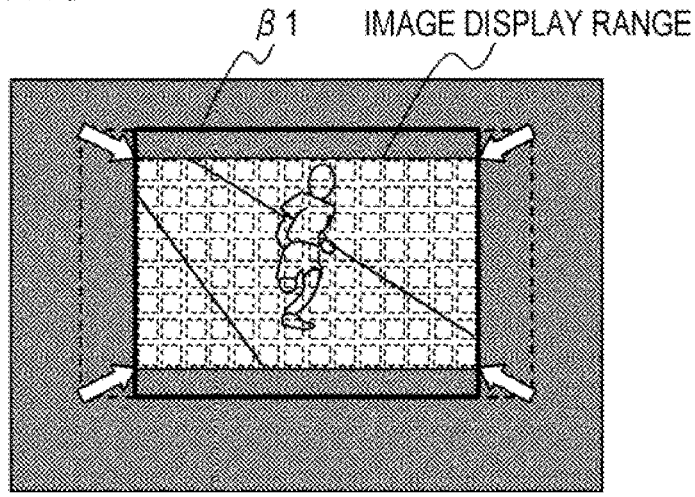

By setting the image display range of the display device 10 at a reduced range on the basis of the oblique look-through state detection result in this manner, the oblique look-through state can be suppressed, enabling an improvement in the viewed point estimation result. Note that in the example described above, the viewed field range β1 (a viewed field range in a viewing state where the oblique look-through state is not detected; a viewed field range in a viewing state where the user looks through the viewfinder directly from the front) is set as the image display range, but the image display range may be narrower than the viewed field range β1. As long as at least a part of the viewed field range β1 is set as the image display range, the oblique look-through state can be suppressed, enabling an improvement in the viewed point estimation result. As shown in FIG. 14C, the image display range may also be reduced from the state shown in FIG. 14A while maintaining an aspect ratio.

Description of Camera Operation

Figure 16:
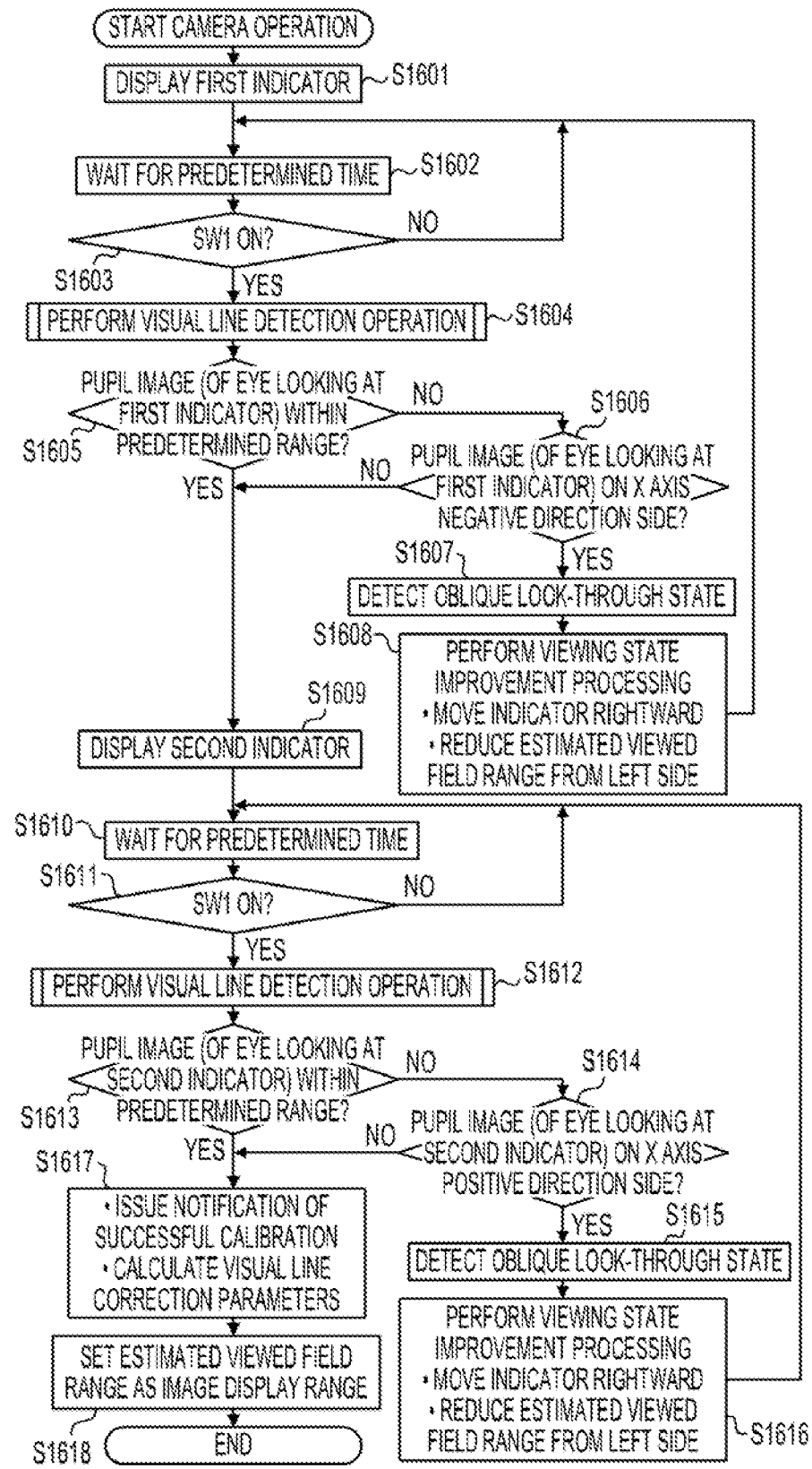
FIG. 16 is a flowchart of a camera operation according to the second embodiment.

A camera operation according to the second embodiment will now be described in accordance with a flowchart shown in FIG. 16. The processing flow of FIG. 16 is started in response to a user operation instructing the start of the calibration operation, for example. The viewed field range β1 described above is dependent on the position of the eyeball 14 (the distance between the eyeball 14 and the eyepiece window frame 121 or the like). Therefore, on the flowchart of FIG. 16, the viewed field range β1 is estimated on the basis of the oblique look-through state detection result, and the image display range of the display device 10 is determined on the basis of the estimated viewed field range β1 (an estimated viewed field range).

In step S1601, the CPU 3 displays the first indicator on which the user is to focus (the indicator on the left side of the center of the screen of the display device 10) on the display device 10.

In step S1602, the CPU 3 waits for a predetermined time.

In step S1603, the CPU 3 determines whether or not the user has pressed (half-pressed) the release button 5 so as to switch the switch SW1 ON. For example, it is assumed that the user switches the switch SW1 ON by half-pressing the release button 5 in order to indicate that s/he is focusing on the first indicator. The CPU 3 advances the processing to step S1604 when the switch SW1 is ON and returns the processing to step S1602 when the switch SW1 is not ON.

In step S1604, the CPU 3 performs the visual line detection operation of FIG. 8. In the visual line detection operation, the coordinates of the pupil image on the eye image, the coordinates of the Purkinje images on the eye image, and the coordinates of the viewed point on the screen of the display device 10 are calculated.

In step S1605, the CPU 3 determines whether or not the first condition is satisfied, or more specifically whether or not the position of the pupil image, detected in the visual line detection operation of step S1604, is within the predetermined range. The CPU 3 advances the processing to step S1606 when the position of the pupil image is outside the predetermined range and advances the processing to step S1609 when the position of the pupil image is within the predetermined range.

In step S1606, the CPU 3 determines whether or not the second condition is satisfied, or more specifically whether or not the direction traveling from the center of the eye image toward the pupil image on the eye image is the X axis negative direction (the opposite direction to the X axis positive direction traveling from the center of the screen of the display device 10 toward the first indicator). The CPU 3 advances the processing to step S1607 when the pupil image is positioned on the X axis negative direction side and advances the processing to step S1609 when the pupil image is positioned on the X axis positive direction side.

In step S1607, the CPU 3 determines that the current state is the oblique look-through state. In step S1608, since the viewed point estimation result acquired during the visual line detection operation in step S1604 includes a non-negligible error, meaning that calibration cannot be performed appropriately (appropriate visual line correction parameters cannot be acquired), the CPU 3 performs viewing state improvement processing. The processing is then returned to step S1602, where the visual line detection operation is performed again.

Figure 13B:
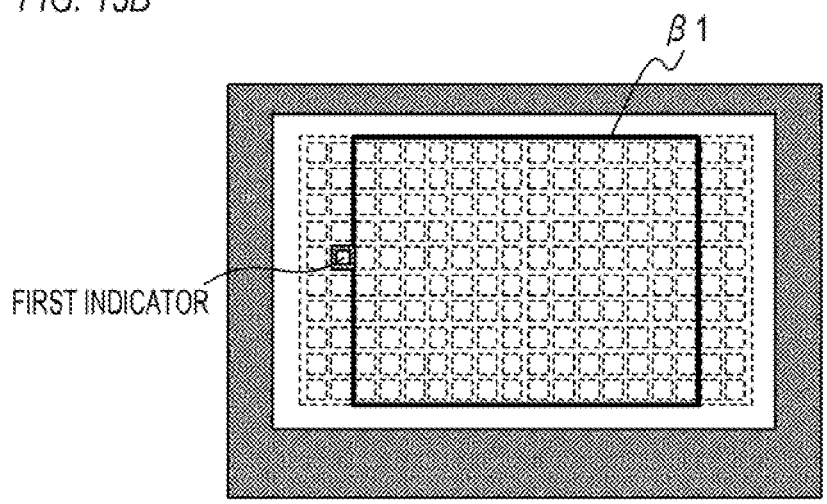
Figure 13C:
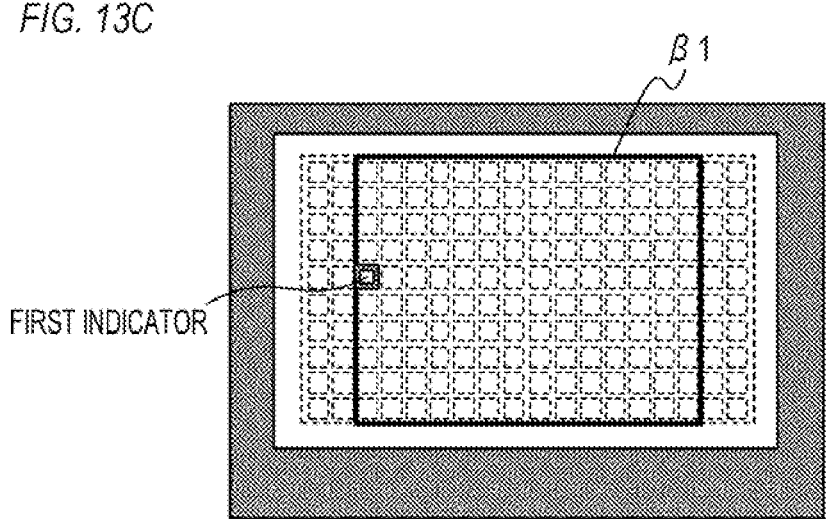

In the second embodiment, as shown in FIG. 13B, the CPU 3 moves the first indicator closer to the center of the screen of the display device 10 during the viewing state improvement processing of step S1608. Further, the CPU 3 reduces the estimated viewed field range (the viewed field range estimated as the viewed field range β1) from a default range (the entire range of the screen, for example). More specifically, the CPU 3 reduces the estimated viewed field range from the left side so that the position of the left edge of the estimated viewed field range is aligned with the position of the first indicator. In the state shown in FIG. 13B, the first indicator is still disposed outside the viewed field range β1, and therefore the user adopts the oblique look-through state. Accordingly, the viewing state improvement processing of step S1608 is performed again so that, as shown in FIG. 13C, the estimated viewed field range is reduced while the first indicator is disposed within the viewed field range β1. Thus, the user can view the first indicator without having to look through the eyepiece window frame 121 from an angle, and as a result, the oblique look-through state can be eliminated. Hence, at the point where the oblique look-through state is eliminated, the left edge of the viewed field range β1 serves as the left edge (the X axis positive direction edge) of the estimated viewed field range.

Note that the viewing state improvement processing is not limited to the processing described above, and as long as the user can be prompted to improve the viewing state so that calibration can be performed appropriately, for example, any processing may be performed as the viewing state improvement processing. More specifically, as described in the first embodiment, the viewing state improvement processing may consist of issuing a warning that the oblique look-through state is established.

In step S1609, the CPU 3 displays the second indicator on which the user is to focus (the indicator on the right side of the center of the screen of the display device 10) on the display device 10. At this time, the processing relating to the first indicator is assumed to be complete, and therefore the first indicator is not displayed.

In step S1610, the CPU 3 waits for a predetermined time.

In step S1611, the CPU 3 determines whether or not the user has pressed (half-pressed) the release button 5 so as to switch the switch SW1 ON. For example, it is assumed that the user switches the switch SW1 ON by half-pressing the release button 5 in order to indicate that s/he is focusing on the second indicator. The CPU 3 advances the processing to step S1612 when the switch SW1 is ON and returns the processing to step S1610 when the switch SW1 is not ON.

In step S1612, the CPU 3 performs the visual line detection operation of FIG. 8. In the visual line detection operation, the coordinates of the pupil image on the eye image, the coordinates of the Purkinje images on the eye image, and the coordinates of the viewed point on the screen of the display device 10 are calculated.

In step S1613, the CPU 3 determines whether or not the first condition is satisfied, or more specifically whether or not the position of the pupil image, detected in the visual line detection operation of step S1612, is within the predetermined range. The CPU 3 advances the processing to step S1614 when the position of the pupil image is outside the predetermined range and advances the processing to step S1617 when the position of the pupil image is within the predetermined range.

In step S1614, the CPU 3 determines whether or not the second condition is satisfied, or more specifically whether or not the direction traveling from the center of the eye image toward the pupil image on the eye image is the X axis positive direction (the opposite direction to the X axis negative direction traveling from the center of the screen of the display device 10 toward the second indicator). The CPU 3 advances the processing to step S1615 when the pupil image is positioned on the X axis positive direction side and advances the processing to step S1617 when the pupil image is positioned on the X axis negative direction side.

In step S1615, the CPU 3 determines that the current state is the oblique look-through state. In step S1616, since the viewed point estimation result acquired during the visual line detection operation of step S1612 includes a non-negligible error, meaning that calibration cannot be performed appropriately (appropriate visual line correction parameters cannot be acquired), the CPU 3 performs the viewing state improvement processing. The processing is then returned to step S1610, where the visual line detection operation is performed again. In the second embodiment, similarly to the viewing state improvement processing of step S1608, the CPU 3 moves the second indicator closer to the center of the screen of the display device 10 during the viewing state improvement processing of step S1616, thereby updating the estimated viewed field range. More specifically, the estimated viewed field range is reduced from the right side so that the position of the right edge of the estimated viewed field range is aligned with the position of the second indicator. Similarly to the viewing state improvement processing of step S1608, the viewing state improvement processing of step S1616 is repeated until the oblique look-through state is eliminated. Hence, at the point where the oblique look-through state is eliminated, the right edge of the viewed field range β1 serves as the right edge (the X axis negative direction edge) of the estimated viewed field range.

In step S1617, the CPU 3 determines that the processing relating to all of the indicators is complete and notifies the user that calibration has been performed successfully. Further, the CPU 3 calculates the visual line correction parameters from the viewed point estimation results acquired while focusing on the respective indicators, and stores the visual line correction parameters in the memory unit 4. Note that FIG. 16 only shows the processing relating to the first indicator (the left-side indicator) and the processing relating to the second indicator (the right-side indicator), but in actuality, the processing is performed in relation to each of the five indicators shown in FIG. 13A.

Hence, in the second embodiment, control for moving the indicators closer to the center of the screen of the display device 10 until the oblique look-through state is no longer detected after the indicators are displayed at the edges of the screen is performed in relation to a plurality of sides of the screen. A range of the screen of the display device 10 that includes a plurality of positions in which the user can see indicators without the oblique look-through state being detected is then estimated as the viewed field range β1. Note that the method of estimating the viewed field range β1 is not limited thereto. Instead, for example, a plurality of positions in which the oblique look-through state is not detected may be detected while varying the positions of the indicators between a plurality of predetermined positions, and a range that includes the plurality of detected positions (the smallest range including the plurality of positions) may be estimated as the viewed field range β1.

In step S1618, the CPU 3 sets the estimated viewed field range as the image display range of the display device 10 and then terminates the processing flow of FIG. 16.

Summary

According to the second embodiment, as described above, by using the second condition in addition to the first condition, the oblique look-through state can be detected with an even higher degree of precision than in the first embodiment.

When the calibration operation is performed in the oblique look-through state, a non-negligible error is included in the viewed point estimation result, making it impossible to acquire appropriate visual line correction parameters. According to the second embodiment, the oblique look-through state is detected and eliminated during the calibration operation, and therefore appropriate visual line correction parameters can be acquired. As a result, the precision with which the viewed point is estimated during image capture or the like following the calibration operation can be improved.

Further, according to the second embodiment, the indicators are moved closer to the center of the screen of the display device 10 in order to eliminate the oblique look-through state. The viewed field range β1 corresponding to a favorable viewing state (in which the user looks through the eyepiece window frame 121 directly from the front), i.e. not the oblique look-through state, can then be specified from the plurality of indicators following elimination of the oblique look-through state. By using the specified viewed field range β1, the user-friendliness of the camera 1 can be improved. For example, by displaying a reduced viewing image that fits into the specified viewed field range β1 during image capture or the like following the calibration operation, the oblique look-through state can be suppressed, enabling an improvement in the viewed point estimation precision. More specifically, according to the second embodiment, the oblique look-through state is detected, whereupon a viewed field range in a state where the oblique look-through state is not detected is estimated on the basis of the oblique look-through state detection result. The image display range of the display device is then determined on the basis of the estimated viewed field range. Hence, by a simple configuration, it is possible to determine an image display range in which the entire image can be viewed in a state where the oblique look-through state is not detected, and as a result, a state in which the viewed point cannot be estimated with a high degree of precision can be eliminated.

Note that in the example described above, the viewed field range is estimated during the calibration operation, and either during or after the calibration operation, the image display range is determined on the basis of the estimated viewed field range. Instead, however, the viewed field range may be estimated and the image display range may be determined on the basis of the estimated viewed field range during a period in which the calibration operation is not underway. Further, instead of estimating the viewed field range, the size and/or position of the image display range may be modified on the basis of the oblique look-through state detection result (whether or not the oblique look-through state is established, the positions of the pupil image and the Purkinje images on the eye image, and so on).

Third Embodiment

A third embodiment of the present invention will now be described. Note that below, description of the same points (configurations, processing, and so on) as in the second embodiment will be omitted, and points that differ from the second embodiment will be described. In the example described in the second embodiment, the image display range is reduced. In the third embodiment, an example in which the image display range is moved will be described.

Description of Viewing State Improvement Method

As described above, the user adopts the oblique look-through state when the visual line of the user is blocked by the eyepiece window frame or the like so that the user cannot see the edges of the display device 10 (the screen). Hence, in the third embodiment, when the oblique look-through state is detected, the image display range of the display device 10 is moved from the current range and set.

Figure 17A:
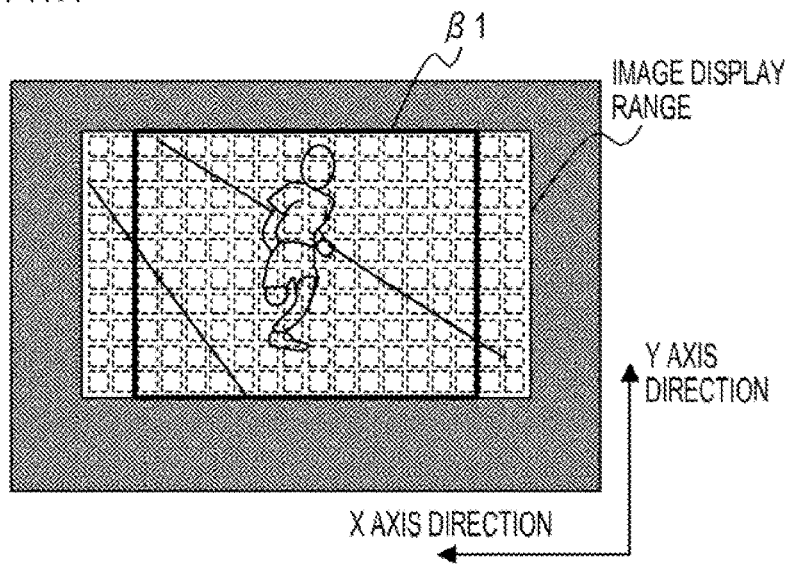
FIGS. 17A to 17C are views showing image displays according to a third embodiment.
Figure 18A:
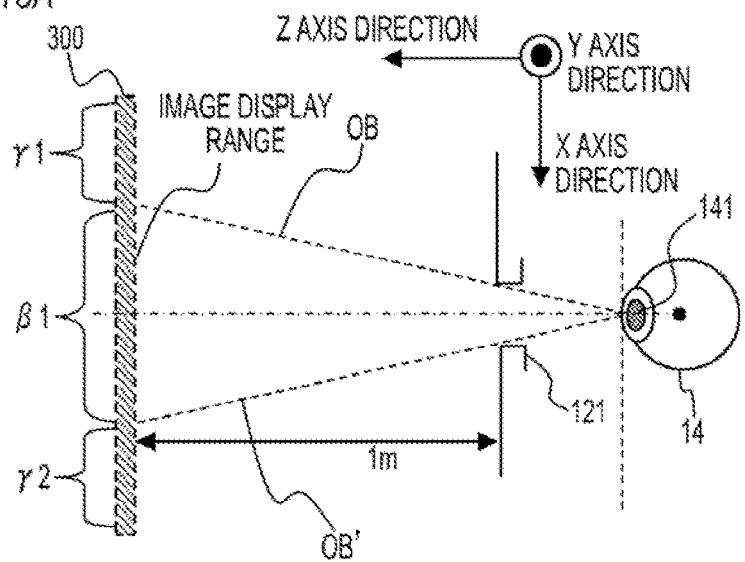
FIGS. 18A to 18C are views showing viewing states according to the third embodiment.

FIG. 17A shows an image display state before detecting the oblique look-through state. FIG. 18A is a schematic view of the viewing state at this time. The viewed field is limited by the eyepiece window frame 121 so that only a partial range β1 of the virtual image 300 on the display device 10 (the screen) is within the viewed field. Accordingly, the user cannot see partial ranges γ1, γ2 of the virtual image 300. In order to see the ranges γ1, γ2, the user adopts the oblique look-through state, and as a result, a non-negligible error occurs in the viewed point estimation result.

Figure 17B:
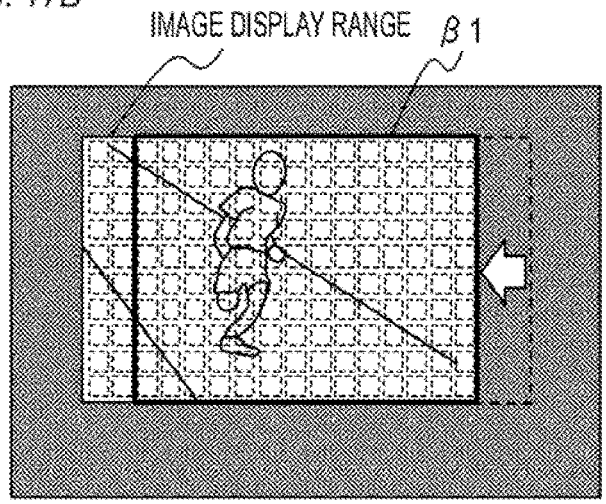
Figure 18B:
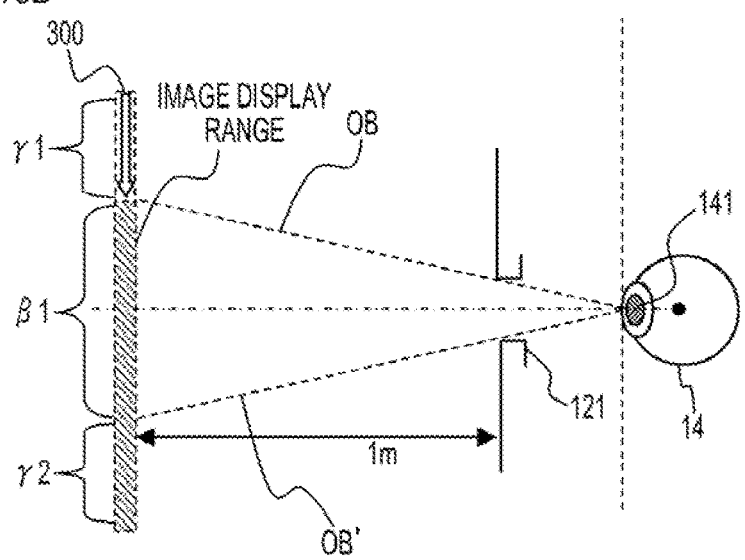

Hence, in the third embodiment, as shown in FIG. 17B, the image display range of the display device 10 is moved in the leftward direction (the X axis positive direction) so that the right edge (the X axis negative direction edge) of the image display range of the display device 10 matches the right edge of the range β1 that can be seen by the user. FIG. 18B is a schematic view showing the viewing state following this movement. By moving the image display range so that the edge of the image display range in the X axis negative direction is included in the viewed field range β1, the user can see the right edge (the X axis negative direction edge) of the image displayed on the display device 10 without adopting the oblique look-through state. In other words, a situation in which it is not necessary to adopt the oblique look-through state (a situation in which it is not necessary to move the head translationally) can be created as a situation in a case where the user wishes to see the right edge of the image. The user can thus be prompted to improve the viewing state (eliminate the oblique look-through state), and as a result, an accurate (highly precise) viewed point estimation result can be acquired.

Figure 17C:
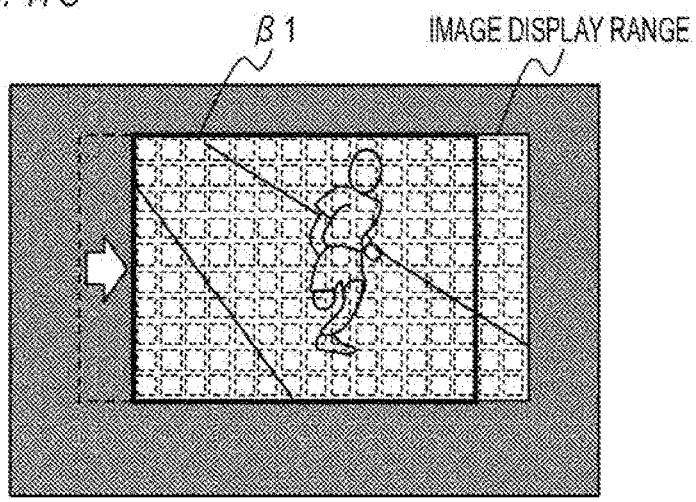
Figure 18C:
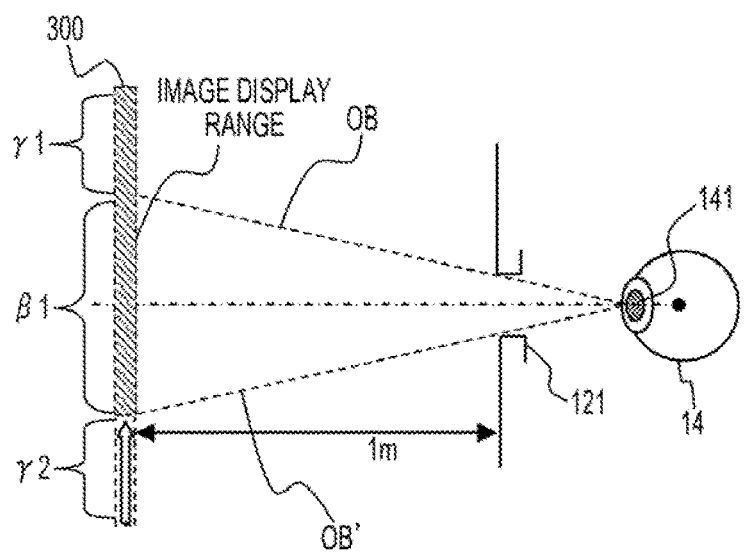

As shown in FIG. 17C, the image display range of the display device 10 may be moved in the rightward direction (the X axis negative direction) so that the left edge (the X axis positive direction edge) of the image display range of the display device 10 matches the left edge of the range β1 that can be seen by the user. FIG. 18C is a schematic view showing the viewing state following this movement. By moving the image display range so that the edge of the image display range in the X axis positive direction is included in the viewed field range β1, the user can see the left edge (the X axis positive direction edge) of the image displayed on the display device 10 without adopting the oblique look-through state. In other words, a situation in which it is not necessary to adopt the oblique look-through state (a situation in which it is not necessary to move the head translationally) can be created as a situation in a case where the user wishes to see the left edge of the image. The user can thus be prompted to improve the viewing state (eliminate the oblique look-through state), and as a result, an accurate (highly precise) viewed point estimation result can be acquired.

By moving the image display range in the opposite direction to the direction that the user wishes to see in this manner, the oblique look-through state can be suppressed, enabling an improvement in the viewed point estimation result. Note that in the example described above, the image display range is moved so that the edge of the image display range matches the edge of the viewed field range β1, but as long as the image display range is moved so as to include at least a part of the viewed field range β1, there are no particular limitations on the movement direction and movement amount of the image display range. By estimating the viewed field range β1 using the method described in the second embodiment or the like, the image display range can be moved on the basis of the estimated viewed field range β1 (the estimated viewed field range) so that the image display range includes at least a part of the viewed field range β1. By moving the image display range in this manner, the oblique look-through state can be suppressed, enabling an improvement in the viewed point estimation result.

Note that when the user wishes to see the right edge (the X axis negative direction edge) of the image, the image display range is preferably moved in the X axis positive direction, and when the user wishes to see the left edge (the X axis positive direction edge) of the image, the image display range is preferably moved in the X axis negative direction. Accordingly, when the oblique look-through state is detected in a case where the user wishes to see the right edge of the image, the image display range may be moved in the X axis positive direction, and when the oblique look-through state is detected in a case where the user wishes to see the left edge of the image, the image display range may be moved in the X axis negative direction. In other words, the movement direction and movement amount of the image display range may be determined on the basis of the oblique look-through state detection result. When the pupil image and the Purkinje images are positioned in locations greatly removed from the center of the eye image in the X axis positive direction, it can be determined that the user wishes to see the right edge of the image, and when the pupil image and the Purkinje images are positioned in locations greatly removed from the center of the eye image in the X axis negative direction, it can be determined that the user wishes to see the left edge of the image.

Summary

According to the third embodiment, as described above, the image display range of the display device is moved on the basis of the estimated viewed field range. By this simple configuration, it is possible to determine an image display range in which the entire image can be viewed in a state where the oblique look-through state is not detected, and as a result, a state in which the viewed point cannot be estimated with a high degree of precision can be eliminated.

Fourth Embodiment

A fourth embodiment of the present invention will now be described. Note that below, description of the same points (configurations, processing, and so on) as in the second embodiment will be omitted, and points that differ from the second embodiment will be described. In the fourth embodiment, another example in which the oblique look-through state is detected during the calibration operation will be described.

The plurality of indicators displayed during the calibration operation include two indicators sandwiching the center of the screen of the display device 10. More specifically, as shown in FIG. 13A, the first indicator (the left-side indicator) and the second indicator (the right-side indicator) sandwich the center of the screen of the display device 10. As described in the second embodiment, on the eye image acquired in the oblique look-through state for looking at the first indicator, the pupil image and the Purkinje images are positioned on the opposite side (the X axis negative direction side) to the side of the first indicator (the X axis positive direction side). On the eye image acquired in the oblique look-through state for looking at the second indicator, meanwhile, the pupil image and the Purkinje images are positioned on the opposite side (the X axis positive direction side) to the side of the second indicator (the X axis negative direction side). In other words, the pupil image and Purkinje images on the eye image acquired when looking at the first indicator are positioned on the opposite side to the images acquired when looking at the second indicator.

Description of Oblique Look-Through Detection Method

As described above, a third characteristic of the oblique look-through state is that the pupil image and Purkinje images on the eye image acquired when looking at the first indicator are positioned on the opposite side to the images acquired when looking at the second indicator. Hence, in the fourth embodiment, a third condition, namely that a direction traveling from the center of the eye image toward the pupil image on the eye image when looking at the first indicator is opposite to the same direction when looking at the second indicator, is used. The oblique look-through state can also be detected by the simple configuration of determining whether or not the third condition is satisfied. More specifically, a state in which the third condition is satisfied can be detected as the oblique look-through state. In the fourth embodiment, a determination is made as to whether or not the first and second conditions described in the second embodiment and the third condition described above are all satisfied, and a state in which the first, second, and third conditions are all satisfied is detected as the oblique look-through state. By using all of the first, second, and third conditions, the oblique look-through state can be detected with an even higher degree of precision than in the second embodiment. The first and third conditions may be used without using the second condition. Further, the third condition may be used alone.

Note that in the calibration operation, as described above, the position at which the user is to look is specified by an indicator. It may therefore be said that the third condition is a suitable condition for detecting the oblique look-through state during the calibration operation. However, as long as the position at which the user is to look is displayed in emphasis on the screen of the display device 10, the third condition can also be used favorably to detect the oblique look-through state at times other than during the calibration operation.

Note that similarly to the first and second conditions, the third condition may focus on the Purkinje images on the eye image rather than the pupil image on the eye image. More specifically, a determination may be made as to whether or not a third condition, namely that directions traveling from the center of the eye image toward the Purkinje images on the eye image when looking at the first indicator are opposite to the same directions when looking at the second indicator, is satisfied, and a state in which this third condition is satisfied may be detected as the oblique look-through state. The third condition may focus on either the pupil image or the Purkinje images, or both. A state in which either all of the conditions (the first, second, and third conditions) relating to the pupil image or all of the conditions (the first, second, and third conditions) relating to the Purkinje images are satisfied may be detected as the oblique look-through state. Alternatively, a state in which all of the conditions relating to the pupil image and all of the conditions relating to the Purkinje images are satisfied may be detected as the oblique look-through state. Further, a state in which a part of the conditions relating to the pupil image and the remainder of the conditions relating to the Purkinje images are satisfied may be detected as the oblique look-through state.

Note that in the example described in the fourth embodiment, the user adopts the oblique look-through state when unable to see the two indicators on the left and right sides of the screen of the display device 10, and the first indicator (the left-side indicator) and the second indicator (the right-side indicator) are used as the two indicators sandwiching the center of the screen. However, the two indicators sandwiching the center of the screen of the display device 10 are not limited to the above indicators. For example, the two indicators sandwiching the center of the screen of the display device 10 may be the two indicators on the upper side and the lower side of the screen. In this case, an oblique look-through state adopted by the user when unable to see the two indicators on the upper and lower sides of the screen of the display device 10 can be detected using the third condition.

Description of Camera Operation

Figure 19:
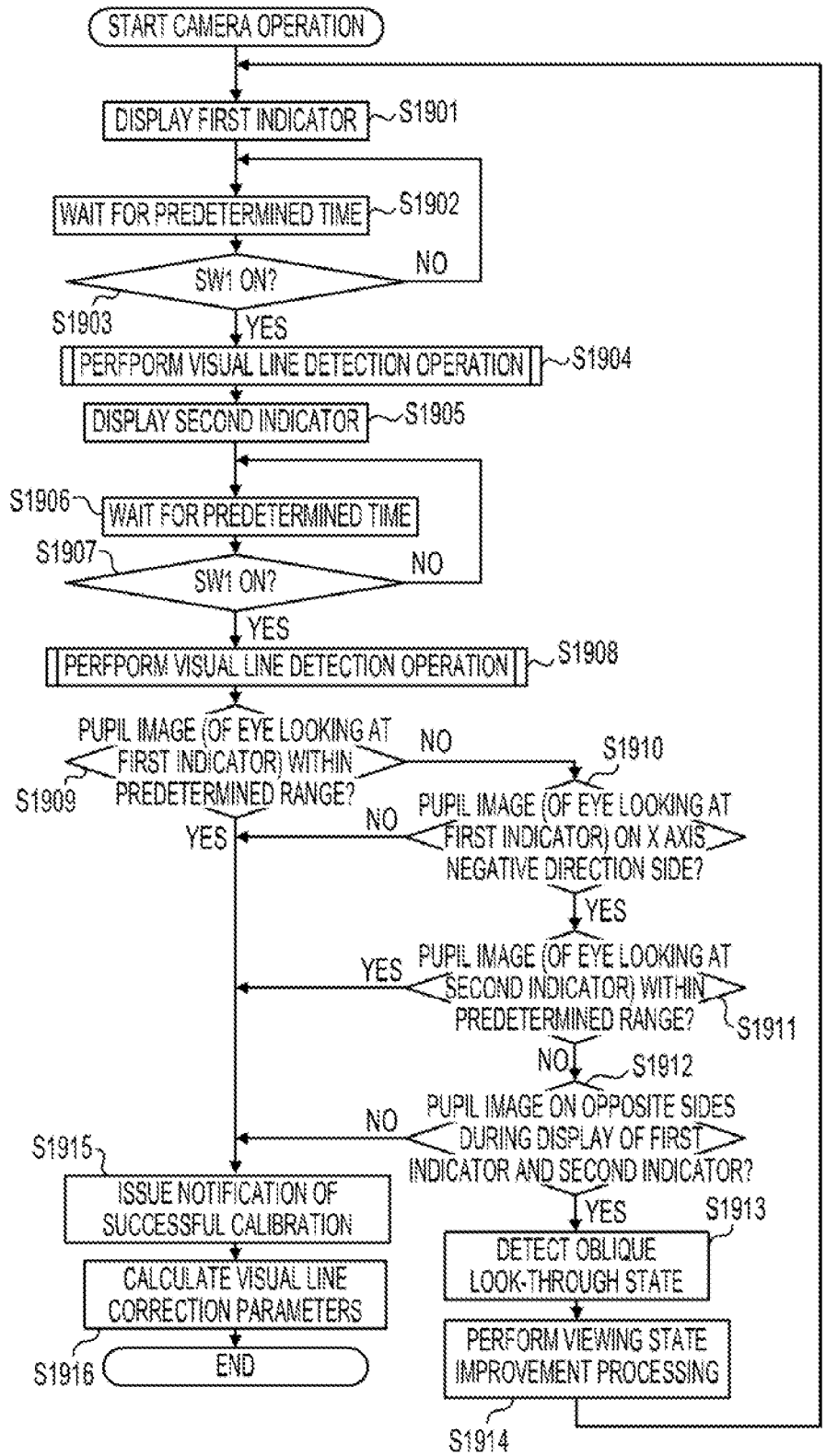
FIG. 19 is a flowchart of a camera operation according to a fourth embodiment.

A camera operation according to the fourth embodiment will now be described in accordance with a flowchart shown in FIG. 19. The processing flow of FIG. 19 is started in response to a user operation instructing the start of the calibration operation, for example.

The processing of steps S1901 to S1904 is similar to the processing of steps S1601 to S1604 in FIG. 16, and the processing of steps S1905 to S1908 is similar to the processing of steps S1609 to S1612 in FIG. 16.

In step S1909, the CPU 3 determines, on the basis of the operation result of step S1904, whether or not the first condition is satisfied while the first indicator is displayed, or more specifically whether or not the position of the pupil image during display of the first indicator is within the predetermined range. The CPU 3 advances the processing to step S1910 when the position of the pupil image is outside the predetermined range and advances the processing to step S1915 when the position of the pupil image is within the predetermined range. The processing of step S1909 is similar to the processing of step S1605 in FIG. 16.

In step S1910, the CPU 3 determines, on the basis of the operation result of step S1904, whether or not the second condition is satisfied while the first indicator is displayed, or more specifically whether or not the direction traveling from the center of the eye image toward the pupil image on the eye image during display of the first indicator is the X axis negative direction. The CPU 3 advances the processing to step S1911 when the pupil image is on the X axis negative direction side and advances the processing to step S1915 when the pupil image is on the X axis positive direction side. The processing of step S1910 is similar to the processing of step S1606 in FIG. 16.

In step S1911, the CPU 3 determines, on the basis of the operation result of step S1908, whether or not the first condition is satisfied while the second indicator is displayed, or more specifically whether or not the position of the pupil image during display of the second indicator is within the predetermined range. The CPU 3 advances the processing to step S1912 when the position of the pupil image is outside the predetermined range and advances the processing to step S1915 when the position of the pupil image is within the predetermined range. The processing of step S1911 is similar to the processing of step S1613 in FIG. 16.

In step S1912, the CPU 3 determines, on the basis of the operation results of step S1904 and S1908, whether or not the third condition is satisfied. More specifically, the CPU 3 determines whether or not the direction traveling from the center of the eye image toward the pupil image on the eye image during display of the first indicator is opposite to the same direction during display of the second indicator. When the direction traveling from the center of the eye image toward the pupil image on the eye image during display of the first indicator is opposite to the same direction during display of the second indicator, the CPU 3 advances the processing to step S1913. When, on the other hand, the direction traveling from the center of the eye image toward the pupil image on the eye image during display of the first indicator is identical to the same direction during display of the second indicator, the CPU 3 advances the processing to step S1915.

Note that the determination of step S1912 may be a determination as to whether or not the second condition is satisfied while the second indicator is displayed, or more specifically, a determination as to whether or not the direction traveling from the center of the eye image toward the pupil image on the eye image during display of the second indicator is the X axis positive direction. In other words, in step S1912, similar processing to the processing of step S1614 in FIG. 16 may be performed.

In step S1913, the CPU 3 determines that at least one of the viewing state of the first indicator and the viewing state of the second indicator is an oblique look-through state. In step S1914, since the viewed point estimated in step S1904 and/or the viewed point estimated in step S1908 includes a non-negligible error, meaning that calibration cannot be performed appropriately, the CPU 3 performs viewing state improvement processing. The processing is then returned to step S1901, where the visual line detection operation is performed again. In the fourth embodiment, similarly to the second embodiment, the CPU 3 moves the first indicator and/or the second indicator closer to the center of the screen of the display device 10 during the viewing state improvement processing of step S1914, thereby updating the estimated viewed field range.

In step S1915, the CPU 3 determines that the processing relating to all of the indicators is complete and notifies the user that calibration has been performed successfully. Further, the CPU 3 calculates the visual line correction parameters from the viewed point estimation results acquired while focusing on the respective indicators, and stores the visual line correction parameters in the memory unit 4. Note that FIG. 19 only shows the processing relating to the first indicator (the left-side indicator) and the processing relating to the second indicator (the right-side indicator), but in actuality, the processing is performed in relation to each of the five indicators shown in FIG. 13A.

In step S1916, the CPU 3 sets the estimated viewed field range as the image display range of the display device 10 and then terminates the processing flow of FIG. 19.

According to the fourth embodiment, as described above, by using the third condition in addition to the first and second conditions, the oblique look-through state can be detected with an even higher degree of precision than in the second embodiment. Moreover, appropriate visual line correction parameters can be acquired more reliably than in the second embodiment. As a result, the precision with which the viewed point is estimated during image capture or the like following the calibration operation can be improved more reliably than in the second embodiment.

Fifth Embodiment

A fifth embodiment of the present invention will now be described. Note that below, description of the same points (configurations, processing, and so on) as in the first embodiment will be omitted, and points that differ from the first embodiment will be described. When the user is wearing glasses, the light from the light sources used to illuminate the eyeball of the user may be reflected by the surface of the glasses and pass through the eyepiece lens so as to enter the eye image sensor, and this light may appear on the eye image as a ghost image. In the oblique look-through state, the user looks through the viewfinder with his/her head tilted, and therefore the ghost image moves closer to the center of the eye image in accordance with the tilt of the head. When, as a result, the ghost image overlaps the pupil image or the Purkinje images, the precision with which the pupil image and Purkinje images are detected decreases, leading to a reduction in the viewed point estimation precision. In the fifth embodiment, an example focusing on this problem will be described.

Description of Configuration

Figure 20:
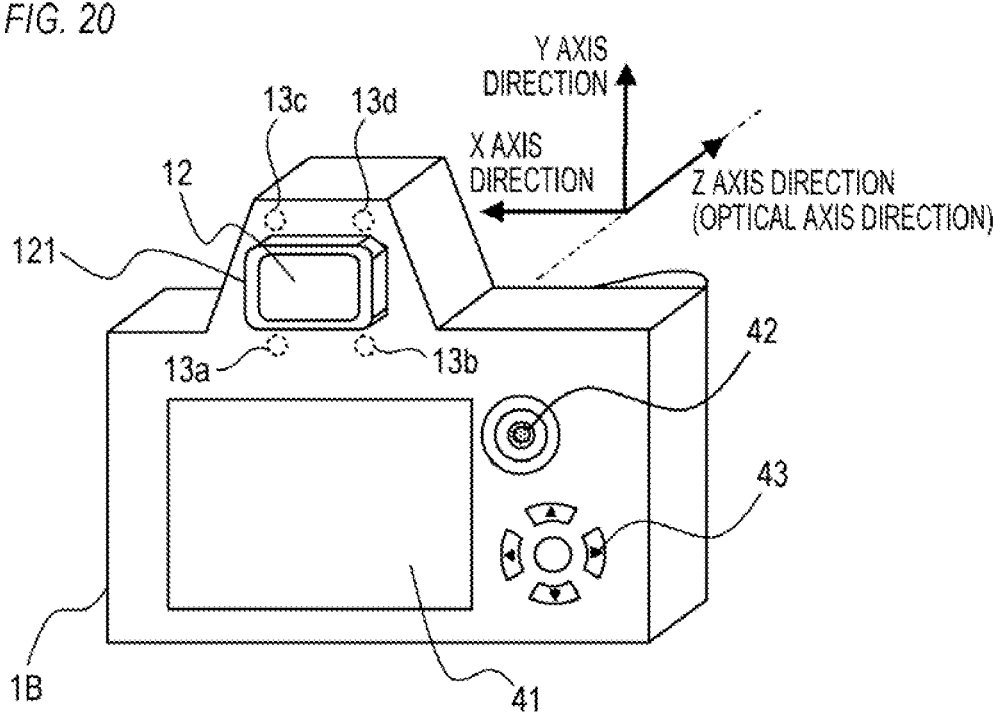
FIG. 20 is a back perspective view of a camera according to a fifth embodiment.

FIG. 20 is a back perspective view showing the outer appearance of the camera 1 (a digital still camera; an interchangeable lens camera). A front perspective view of the camera 1 is identical to the first embodiment (FIG. 1A). As shown in FIG. 20, in the fifth embodiment, four light sources 13a to 13d for illuminating the eyeball of the user are provided around the eyepiece lens 12.

Figure 21:
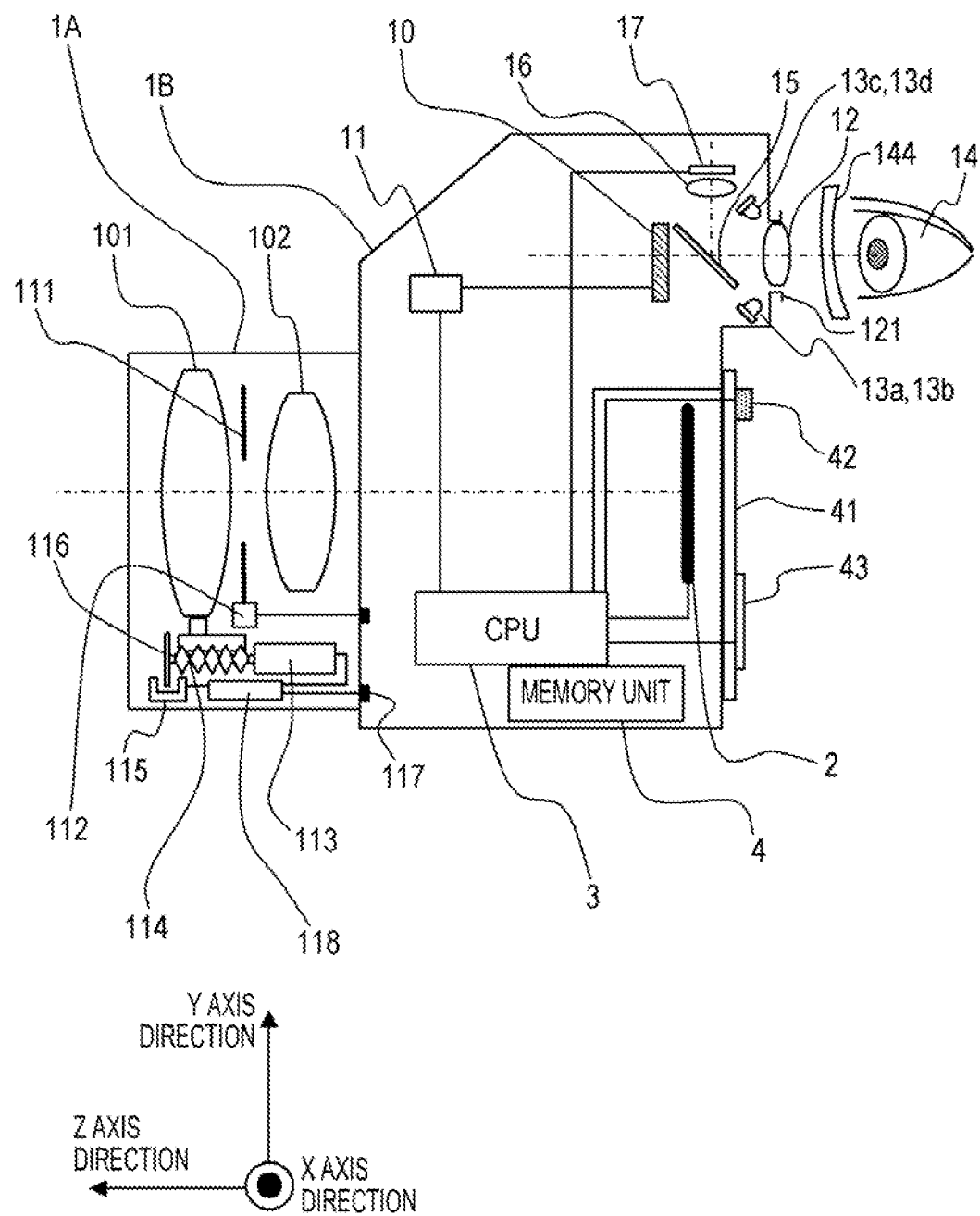
FIG. 21 is a sectional view of the camera according to the fifth embodiment.
Figure 22:
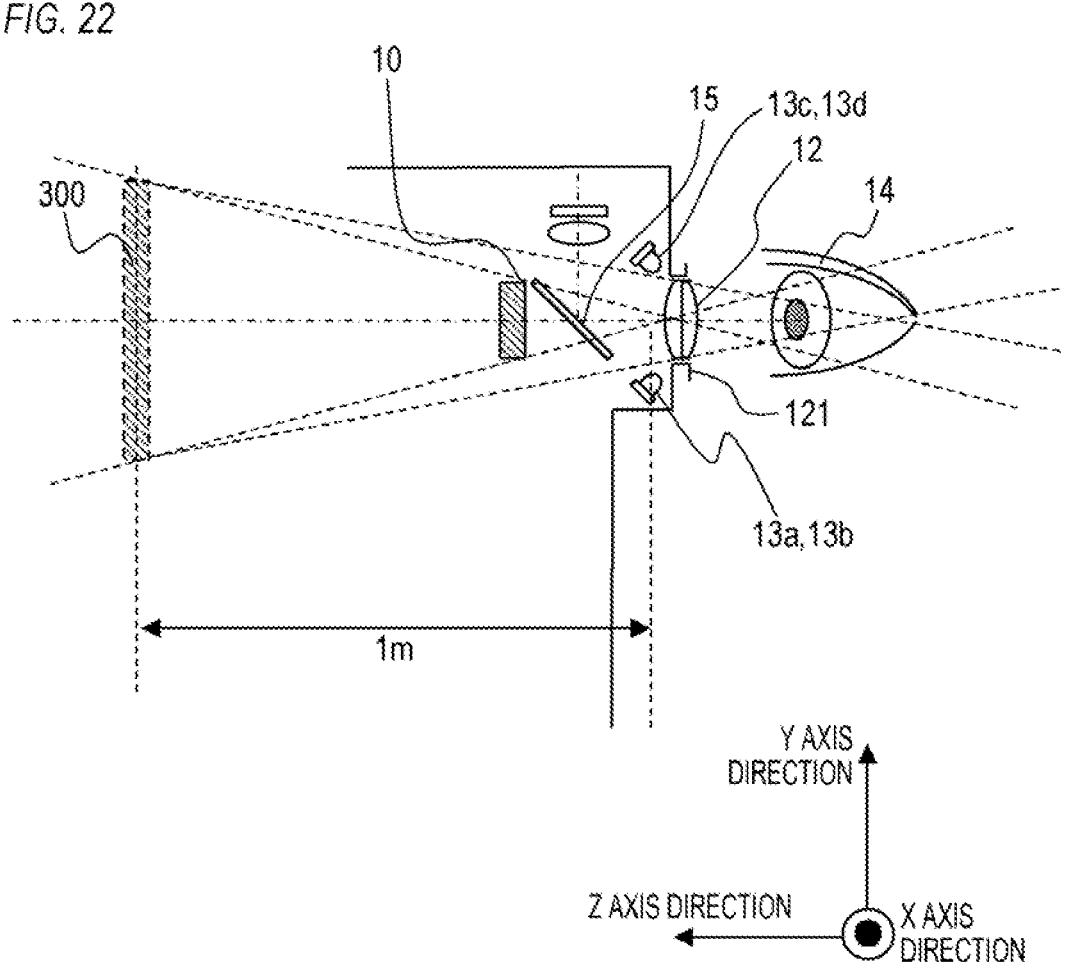
FIG. 22 is a view showing a viewing state according to the fifth embodiment.
Figure 23:
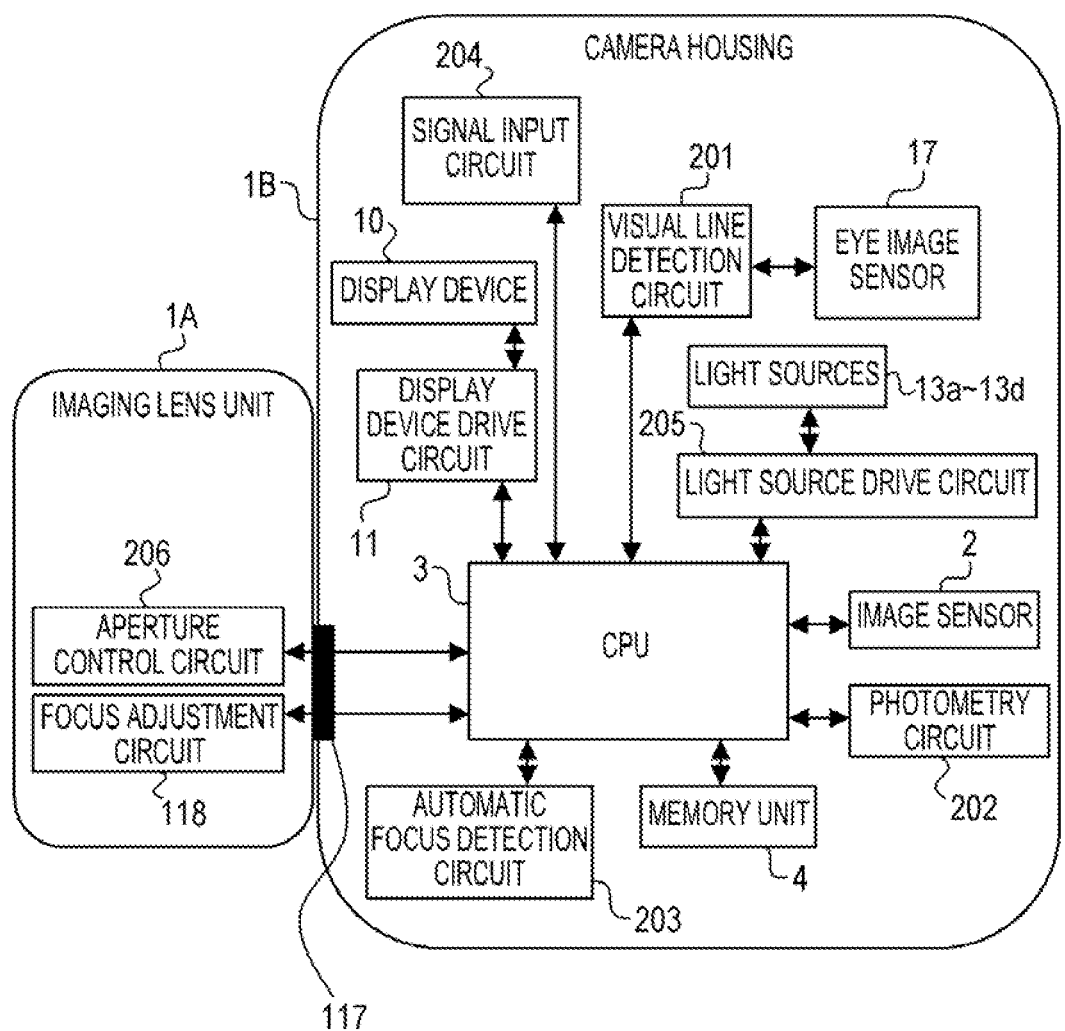
FIG. 23 is a block diagram of the camera according to the fifth embodiment.

FIG. 21 shows a rough internal configuration of the camera 1. FIG. 22 shows a state in which the user is looking through the eyepiece window frame 121. FIG. 23 is a block diagram showing an electrical configuration inside the camera 1. FIGS. 21 to 23 are identical to FIGS. 2 to 4 except that the four light sources 13a to 13d are provided, as described above.

In the fifth embodiment, as shown in FIG. 21, it is assumed that the user is wearing an optical member such as a pair of glasses 144, and that when the user looks through the eyepiece window frame 121, the optical member is positioned between the eyeball 14 and the eyepiece window frame 121.

Figure 24:
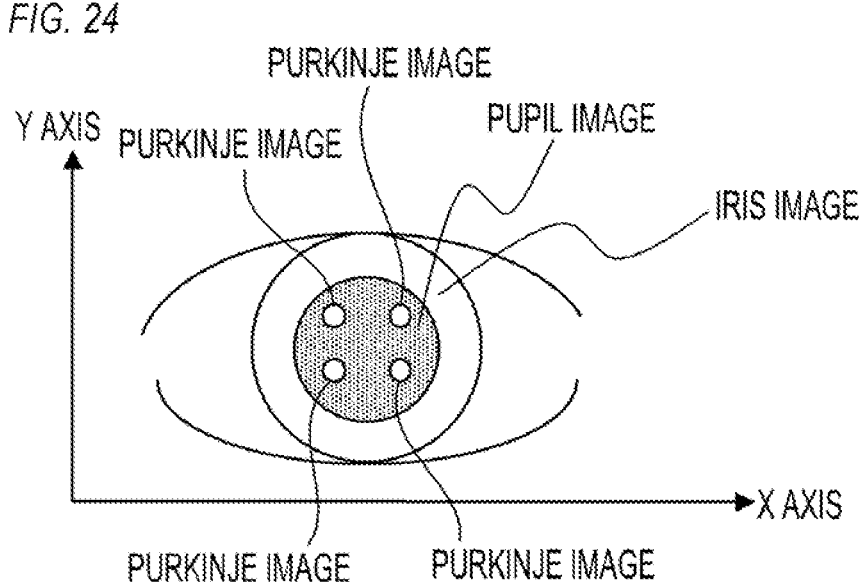
FIG. 24 is a view showing an eye image according to the fifth embodiment.

FIG. 24 is a schematic view of an eye image captured by the eye image sensor 17 (an eyeball image projected onto the eye image sensor 17). Since the four light sources 13a to 13d are used, four Purkinje images (P images; corneal reflection images) appear. The visual line can be detected under a similar principle to the first embodiment on the basis of a combination of a plurality of Purkinje images (there being no particular limitations on the combination) generated by a plurality of light sources, which have shifted in up, down, left, and right directions relative to the eyepiece lens.

Description of Viewing States in which User Looks Through Viewfinder after Moving Head by Large Translational Motion When the user looks through the viewfinder from an angle after moving his/her head translationally, the user often rotates (tilts) his/her entire head, including the eyeball looking through the eyepiece window frame, rather than rotating only the eyeball. When the user is wearing glasses and the user looks through the viewfinder with his/her head tilted, the glasses the user is wearing are tilted in the same direction as the head. As a result, a ghost image generated by light, of the infrared light used to illuminate the eyeball, that is reflected by the surface of the glasses so as to enter the eye image sensor through the eyepiece lens moves close to the center of the eye image in accordance with the tilt of the glasses. The ghost image overlaps the pupil image and Purkinje images near the center of the eye image, thereby impeding detection of these images. When the precision with which the pupil image and the Purkinje images are detected decreases, the viewed point estimation precision also decreases.

Figure 25A:
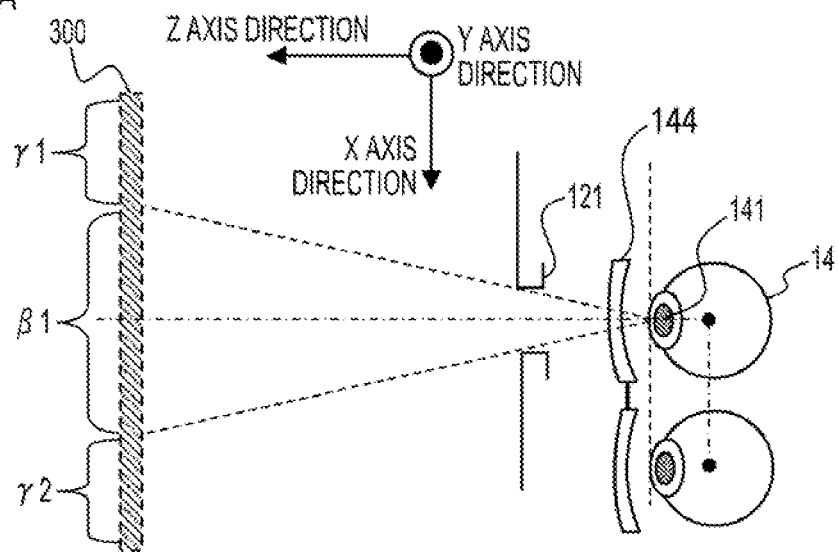
FIGS. 25A to 25C are views showing viewing states according to the fifth embodiment.
Figure 25B:
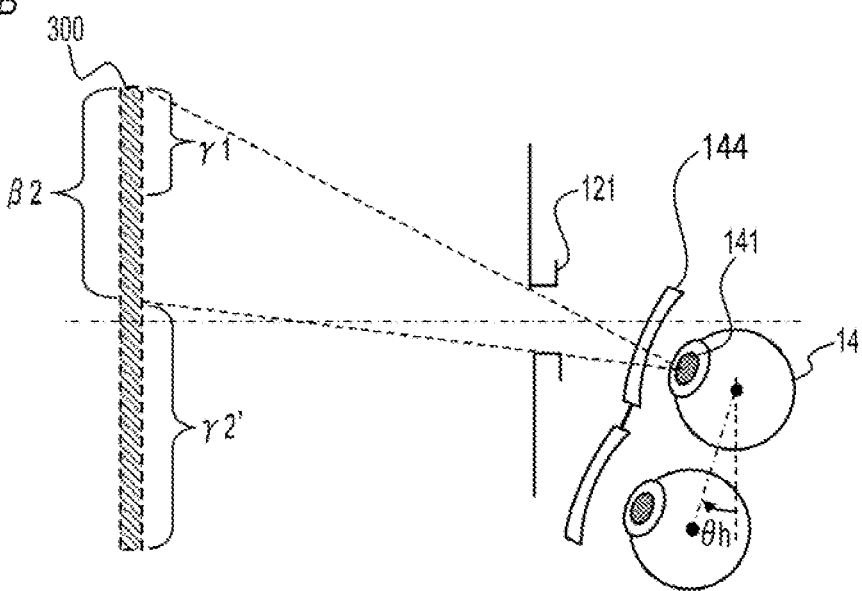
Figure 25C:
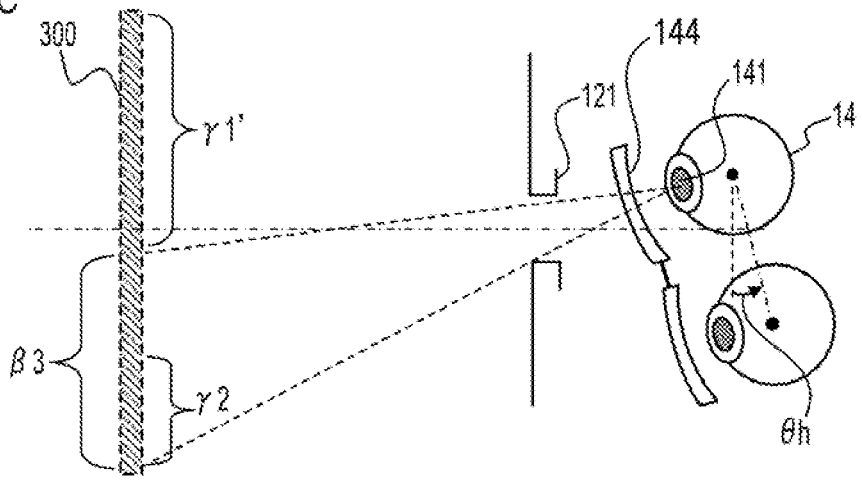

This phenomenon will now be described in more detail using FIGS. 25A to 25C. FIGS. 25A to 25C are schematic plan views showing, from the Y axis positive direction, a state in which the user views the virtual image 300 on the display device 10 (the screen) through the eyepiece window frame 121 and the eyepiece lens 12 using the right eye (the eyeball on the upward-direction side of the paper surface). In FIG. 25A, the user is focusing substantially on the center of the virtual image 300 (the screen of the display device 10) in a state where the center O' of the eyeball 14 is positioned in a position opposing the center of the virtual image 300, i.e. a position through which the optical axis of the eyepiece lens 12 passes. In FIG. 25A, the user cannot view the ranges γ1 and γ2 (the edges of the virtual image 300).

When the user wishes to see the range γ1 that is invisible in the state of FIG. 25A, the user moves his/her entire head, including the eyeball 14, by a large translational motion in the X axis positive direction (the downward direction on the paper surface), as shown in FIG. 25B. Similarly, when the user wishes to see the range γ2 that is invisible in the state of FIG. 25A, the user moves his/her entire head, including the eyeball 14, by a large translational motion in the X axis negative direction (the upward direction on the paper surface), as shown in FIG. 25C. At this time, rather than merely rotating the eyeball 14, the head is often tilted from the state shown in FIG. 25A. In FIGS. 25B and 25C, the head is tilted by angle θh from the state of FIG. 25A. Further, in FIGS. 25A to 25C, the user is wearing the glasses 144, and the glasses 144 likewise tilt in the same direction as the head in accordance with the tilt of the head. As a result, the incline of the optical axis of the glasses 144 varies relative to the optical axis of the eyepiece lens 12, and in accordance therewith, the position of the ghost image that is generated when the light from the light sources is reflected on the surface of the glasses 144 also varies.

As shown in FIG. 26, for example, the ghost image described above is generated when light emitted from the light sources 13a to 13d is reflected by the surface of an optical member such as a pair of glasses, and the resulting reflection light enters the eye image sensor 17, as indicated by arrows in FIG. 26. FIG. 26 shows a path of the light from the light source 13a or the light source 13b, but the light from the light sources 13c and 13d can enter the eye image sensor 17 in a similar manner.

Figure 27A:
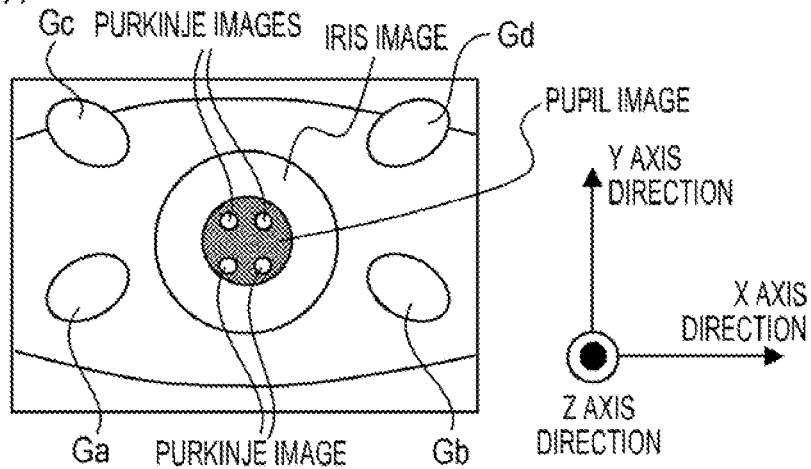
FIGS. 27A to 27C are views showing eye images according to the fifth embodiment.

FIG. 27A shows an example of an eye image on which ghost images appear. Four ghost images Ga to Gd corresponding respectively to the four light sources 13a to 13d appear in FIG. 27A. The ghost images Ga to Gd are generated when the light emitted from the light sources 13a to 13d is reflected by the surface of the glasses, and the ghost images appear separately to the Purkinje images generated when the light emitted from the light sources 13a to 13d is reflected by the surface of the cornea of the eyeball. The eye image shown in FIG. 27A corresponds to the state illustrated in FIG. 25A. As shown in FIG. 27A, when an optical member such as a pair of glasses worn by the user is oriented directly frontward, the ghost images Ga to Gd appear substantially in left-right symmetry about the center of the eye image.

Figure 27B:
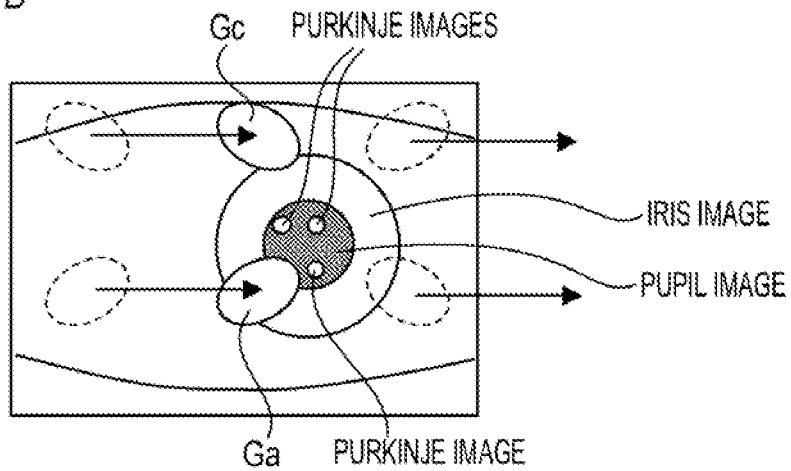

Here, in an oblique look-through state established when the glasses are tilted together with tilting of the head, the ghost images move so that an eye image such as that shown in FIG. 27B is acquired. In FIG. 27B, due to tilting of the glasses accompanying tilting of the head, the ghost images Ga to Gd have all moved in the X axis positive direction (a rightward direction on the paper surface) from the state shown in FIG. 27A. As a result, the ghost image Ga generated by the light source 13a overlaps a part of the pupil image so that this part of the pupil image is hidden. When at least a part of the pupil image is hidden, the precision with which the pupil image is detected decreases. When the pupil image detection precision decreases, the viewed point estimation precision also decreases.

Hence, in the fifth embodiment, a light source, among the plurality of light sources, generating a ghost image that moves into the central portion (the center and the vicinity thereof) of the eye image is determined on the basis of the viewing state detection result, and the determined light source is switched OFF. Thus, the occurrence of ghost images in the central portion of the eye image can be suppressed, enabling an improvement in the pupil image detection precision. Accordingly, the viewed point estimation precision can be improved.

Description of Method for Switching Light Sources OFF

A process for improving various types of detection precision after detecting the oblique look-through state by switching OFF the light sources that are oriented in a direction corresponding to the look-through direction in order to suppress the occurrence of ghost images near the center of the eye image will now be described in more detail.

Figure 28A:
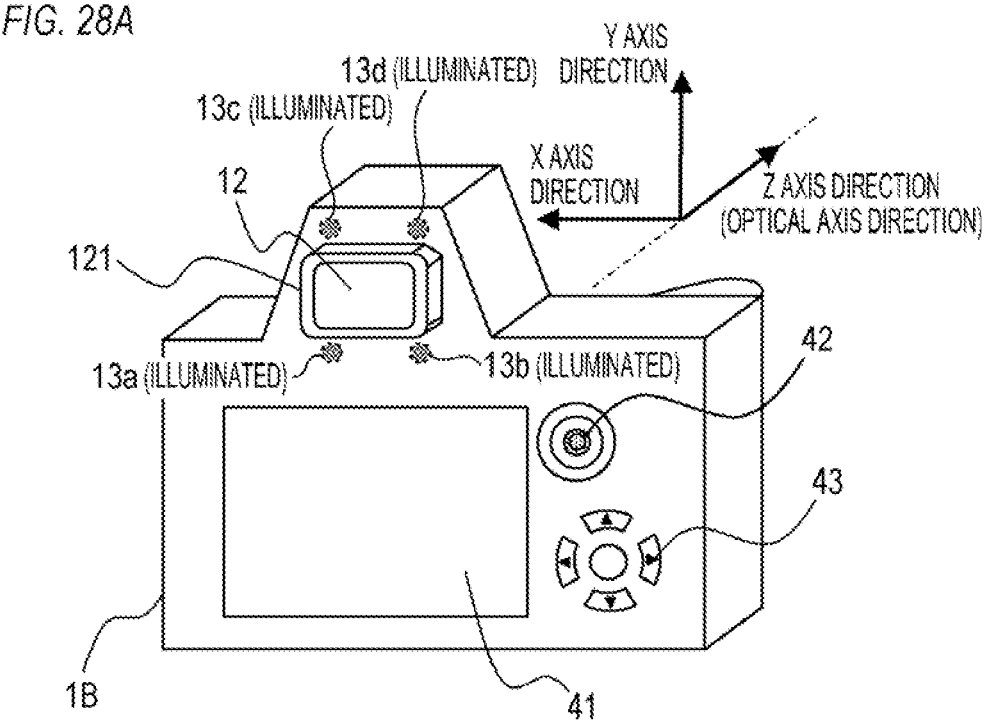
FIGS. 28A and 28B are back perspective views of the camera according to the fifth embodiment.
Figure 28B:
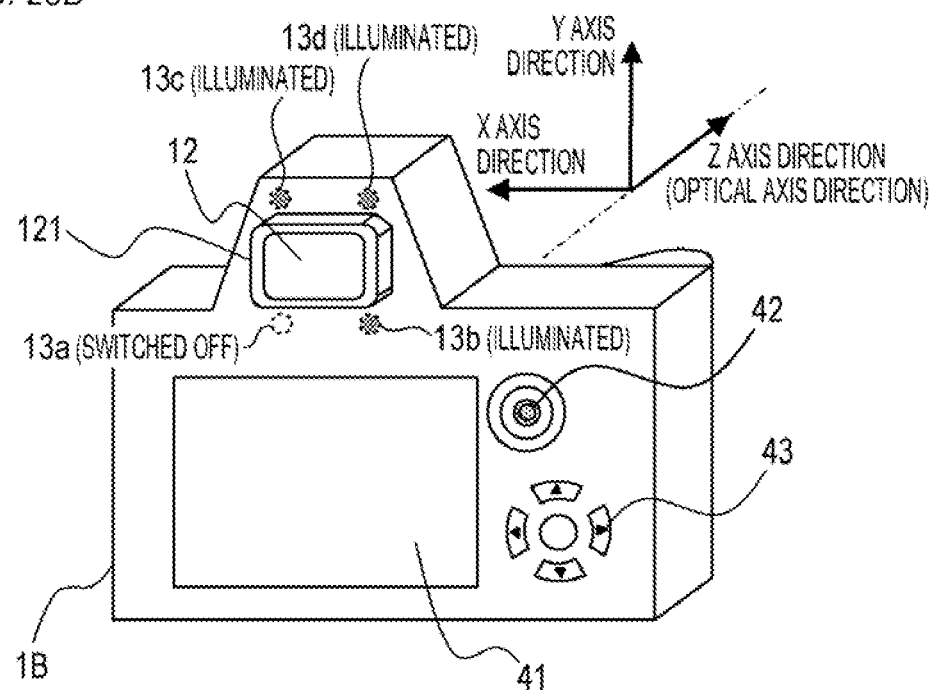

By switching OFF the light source, among the light sources 13a to 13d, generating the ghost image that moves into the central portion of the eye image, as illustrated by variation from the state shown in FIG. 28A to the state shown in FIG. 28B, it is possible to remove ghost images that impede various types of detection from the eye image.

Figure 27C:
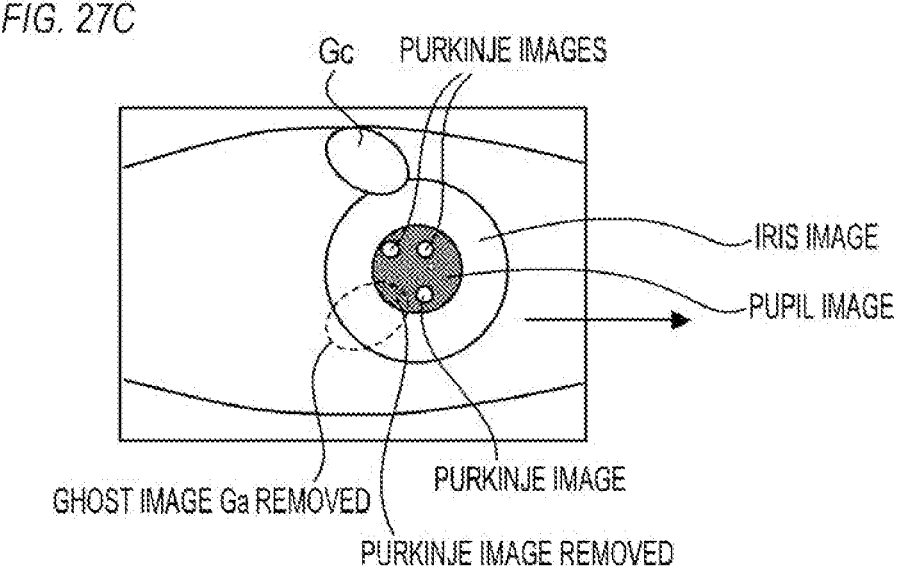

In the example of FIG. 27B, the ghost image Ga originating from the light source 13a impedes various types of detection, and therefore the light source 13a should be switched OFF, as shown in FIG. 28B. When the light source 13a is switched OFF, as shown in FIG. 27C, the ghost image Ga disappears, and therefore the pupil image, including the parts thereof that are overlapped by ghost images, can be detected with a high degree of precision. As a result, deterioration of the precision with which the pupil image and the visual line are detected can be suppressed. At this time, the Purkinje image formed by the light source 13a also disappears, but since Purkinje images continue to be formed by a plurality of other light sources, visual line detection can be performed with a high degree of precision using the plurality of Purkinje images formed by the plurality of other light sources (the light sources 13b to 13d). In the fifth embodiment, the four light sources 13a to 13d are used to ensure that visual line detection can be performed with a high degree of precision even when some of the light sources are switched OFF. Note that as long as three or more light sources are used, the number of light sources is not limited to four. As long as two or more light sources are illuminated, a plurality of light sources may be switched OFF. Visual line detection is possible as long as two or more light sources are illuminated.

However, the processing described above (switching OFF the light sources appropriately) is only possible by identifying the light source generating the ghost image that moves into the central portion of the eye image.

Therefore, in the fifth embodiment, the tilt direction of the head, or in other words the tilt direction of the glasses, is determined by detecting the look-through state using the method described in the other embodiments, the movement direction of the ghost images on the eye image is determined from the tilt direction, and the light source to be switched OFF is determined from the movement direction.

As shown in FIG. 25B, in an oblique look-through state realized when the head moves translationally in the X axis positive direction, both the head and the glasses 144 tilt in a clockwise direction on the paper surface. As shown in FIG. 25C, meanwhile, in an oblique look-through state realized when the head moves translationally in the X axis negative direction, both the head and the glasses 144 tilt in a counterclockwise direction on the paper surface. In other words, the tilt direction of the head and glasses in FIG. 25B is opposite to the tilt direction thereof in FIG. 25C. Hence, the tilt direction of the head and the glasses can be specified from the look-through direction. The movement direction of the ghost images can be learned from the tilt direction of the glasses, and accordingly, the light source generating the ghost image that approaches the vicinity of the center of the eye image can be specified. By switching OFF the specified light source, as shown in FIG. 27B, the ghost image impeding detection of the pupil image can be removed, and as a result, the pupil image detection precision can be improved.

Description of Camera Operation

Figure 29:
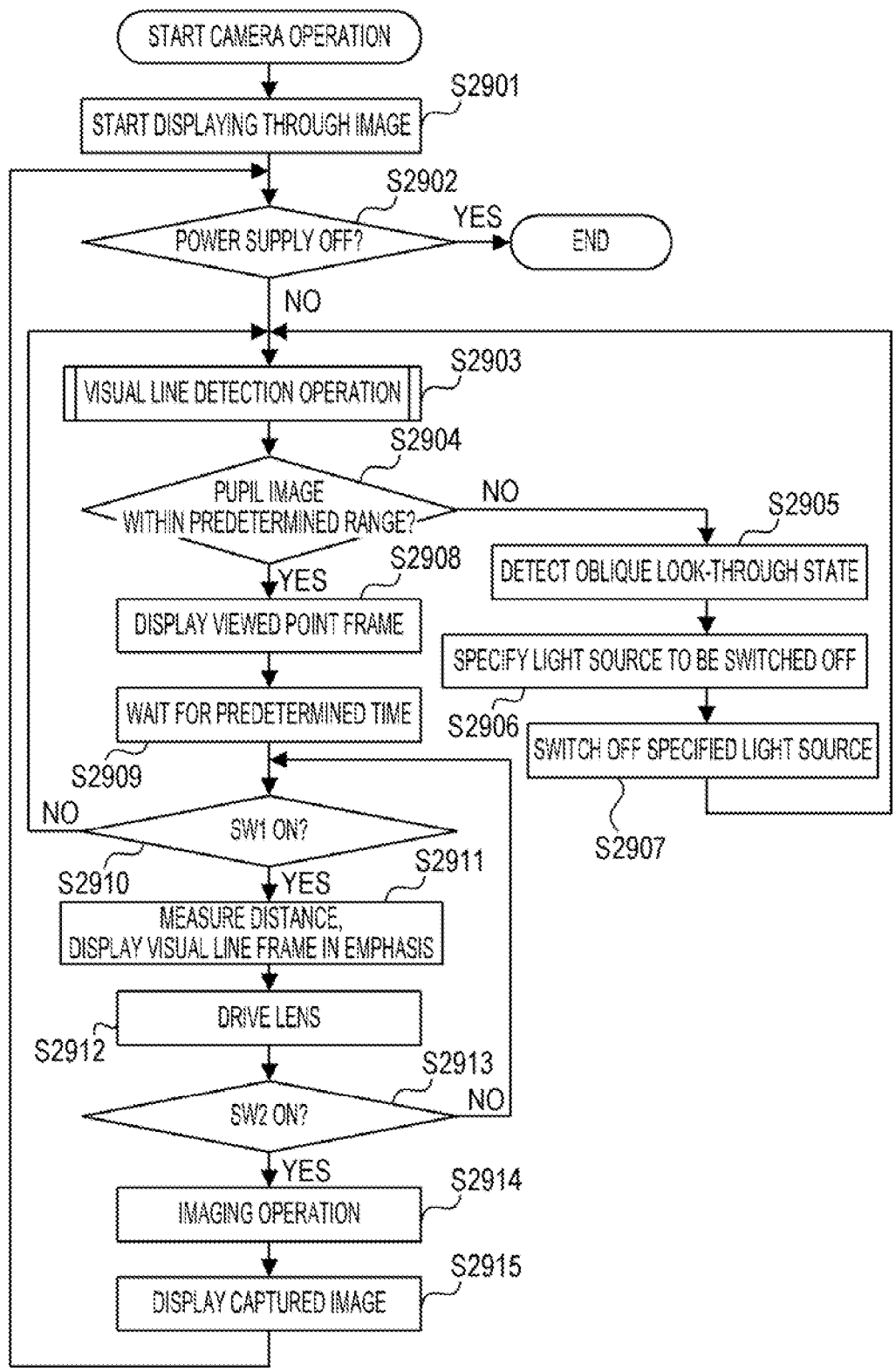
FIG. 29 is a flowchart of a camera operation according to the fifth embodiment.

A camera operation according to the fifth embodiment will now be described in accordance with a flowchart shown in FIG. 29. In the example described here, the oblique look-through state is detected by a method using the first condition, namely that the difference between the center of the eye image and the position of the pupil image on the eye image is greater than a predetermined threshold. However, the oblique look-through state may be detected by another method, such as a method using the second condition. The camera operation of FIG. 29 starts when the power supply of the camera 1 is switched ON.

Figure 12:
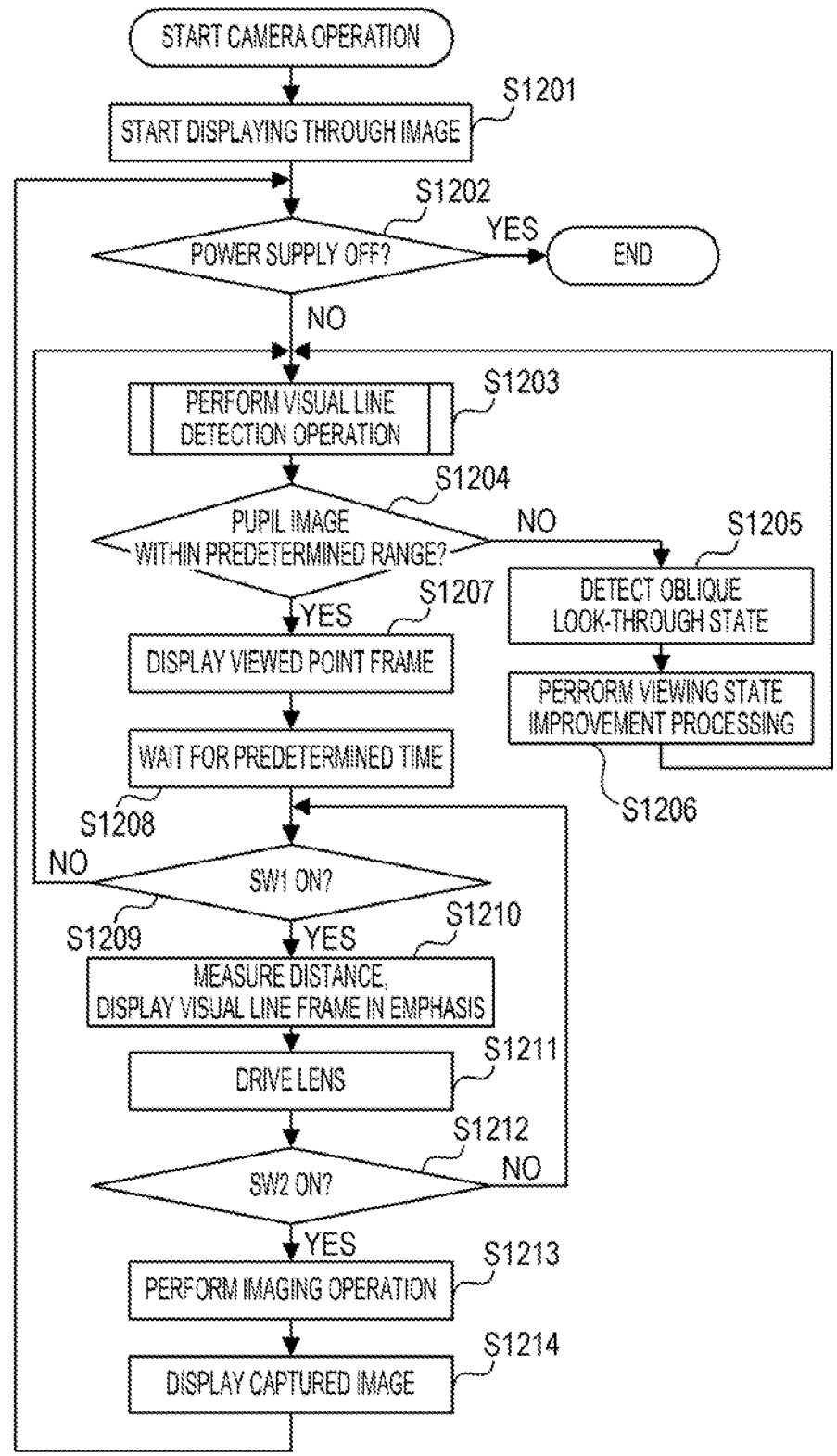
FIG. 12 is a flowchart of a camera operation according to the first embodiment.

The processing of steps S2901 to S2905 and S2908 to S2915 is identical to the processing of steps S1201 to S1205 and S1207 to S1214 in FIG. 12 (the first embodiment).

After detecting the oblique look-through state in step S2906, the CPU 3 specifies the light source to be switched OFF by specifying the look-through direction (the head and glasses) from the movement direction of the pupil image on the eye image. After specifying the light source to be switched OFF, the CPU 3 advances to step S2907.

A specific example of the processing of step S2906 will now be described. On the eye image in FIG. 30A, the pupil image moves in the rightward direction of the paper surface from a predetermined range. In this case, it can be determined that an oblique look-through state resulting from translational motion of the head in the X axis positive direction, or in other words the state shown in FIG. 25B, is established. It can also be determined that the tilt direction of the head and glasses is the clockwise direction on the paper surface of FIG. 25B. The light source to be switched OFF can be specified from the tilt direction of the glasses.

Figure 30A:
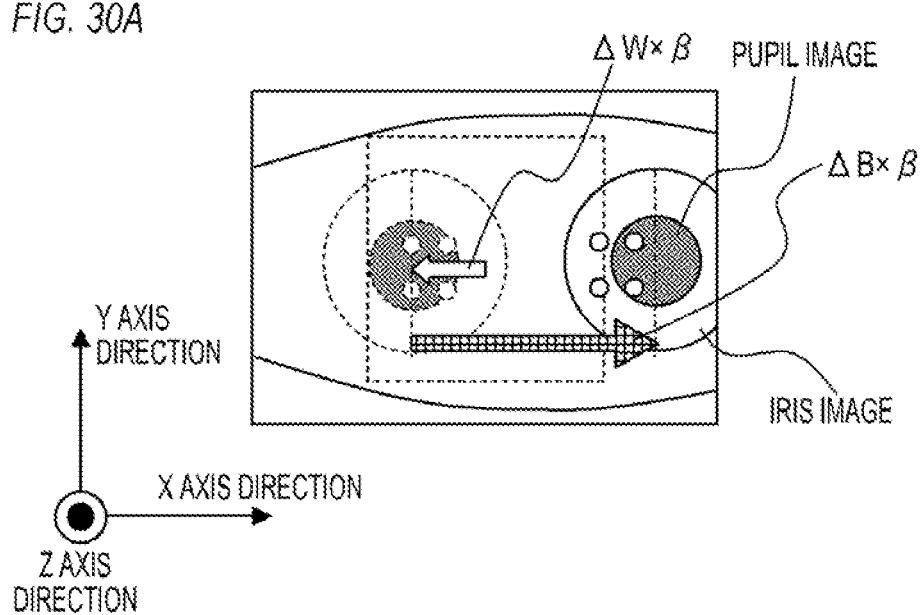
FIGS. 30A and 30B are views showing eye images according to the fifth embodiment.
Figure 30B:
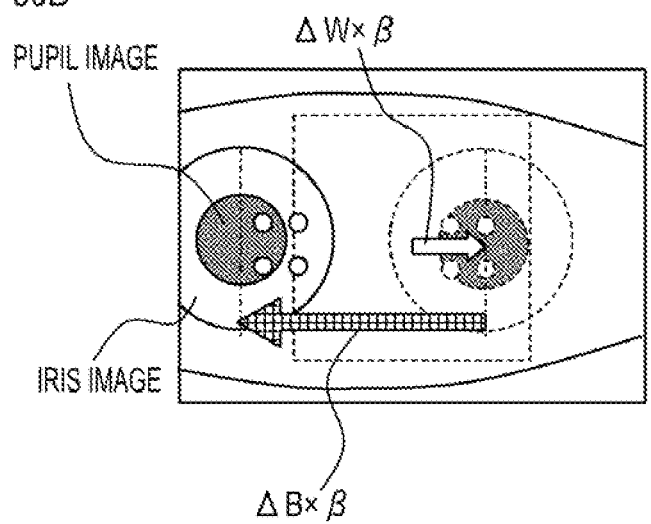

On the eyeball image in FIG. 30B, in contrast to FIG. 30A, the pupil image moves in the leftward direction of the paper surface from a predetermined range. In this case, it can be determined that an oblique look-through state resulting from translational motion of the head in the X axis negative direction, or in other words the state shown in FIG. 25C, is established. It can also be determined that the tilt direction of the head and glasses is the counterclockwise direction on the paper surface of FIG. 25C. The light source to be switched OFF can be specified from the tilt direction of the glasses.

In step S2907, the CPU 3 switches off the light source specified in step S2906. The CPU 3 then returns to the visual line detection operation of step S2903. After passing through steps S2905 to S2907 and returning to step S2903, the CPU 3 performs the visual line detection operation using the light sources, among the plurality of light sources, other than the light source switched OFF in step S2907. As a result, the visual line can be detected with a high degree of precision in a state where no ghost images impede detection of the pupil image.

Summary

According to the fifth embodiment, as described above, the light source, among the plurality of light sources, that is the cause of a ghost image near the center of the eye image can be selected and switched OFF on the basis of the oblique look-through state detection result. Thus, the occurrence of ghost images near the center of the eye image can be suppressed, and as a result, the visual line detection precision can be improved.

Note that the first to fifth embodiments are merely examples, and the present invention also includes configurations acquired by amending or modifying the configurations of the first to fifth embodiments as appropriate within the scope of the spirit of the present invention. The present invention also includes configurations acquired by combining the configurations of the first to fifth embodiments as appropriate.

Further, a viewfinder of a camera was cited as an example, but the present invention is not limited thereto. For example, when visual line detection is performed in an HMD (Head-Mounted Display), which is worn on the head in order to experience VR (Virtual Reality) or the like, the present invention can be used to detect a viewing state in which the HMD shifts relative to the head (the eyeballs). This viewing state may occur when an inexperienced user wears the HMD or when the user moves while wearing the HMD. Similarly, the present invention can be applied to a glasses-type visual line detection device such as AR (Augmented Reality) glasses. The present invention is applicable to all electronic devices that can acquire an eye image by capturing an image of an eye looking at a viewing image through an eye window frame, such as an eyepiece window frame or a glasses frame, that limits the viewed field, and that estimate the viewed point using the acquired eye image.

According to the first to fifth embodiments, as described above, it is possible to provide an electronic device such as a camera, an HMD, or a glasses-type visual line detection device that detects a viewing state in which the user looks at a screen from an oblique direction mainly after translationally moving or tilting the head by a simple configuration. It is also possible to provide an electronic device that eliminates an oblique look-through state by the simple configuration of determining an image display range on the basis of an oblique look-through state detection result. In addition, it is possible to provide an electronic device with which the precision of various types of detection is improved by appropriately switching OFF a light source on the basis of a detection result of the tilt of an optical member such as a pair of glasses in the oblique look-through state.

According to the present disclosure, a state in which viewed point estimation cannot be performed with a high degree of precision can be detected by a simple configuration.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-143077, filed on Aug. 2, 2019, Japanese Patent Application No. 2019-187540, filed on Oct. 11, 2019, and Japanese Patent Application No. 2020-070176, filed on Apr. 9, 2020, which are hereby incorporated by reference herein in their entirety.

What is claimed is:

1. An electronic device capable of acquiring an eye image by capturing an image of an eye looking at a screen of a display through an eye window frame, the electronic device comprising at least one memory and at least one processor which function as:
a first estimating unit configured to estimate a viewed point of the eye on the screen on a basis of the eye image;
a detecting unit configured to detect a shifted viewing state in which the eye shifts from a position corresponding to a center of the screen on the eye image by determining whether or not a position of a pupil image or a Purkinje image on the eye image satisfies a predetermined condition; and
a processing unit configured to perform predetermined processing in a case where the shifted viewing state is detected, wherein
the predetermined processing is processing to determine an image display range, which is a range of the screen in which an image is displayed, on a basis of the shifted viewing state detected by the detecting unit.

2. The electronic device according to claim 1, wherein the detecting unit detects, as the shifted viewing state, a state in which a predetermined condition, including a condition that a difference between the position of the pupil image or the Purkinje image and the position corresponding to the center of the screen is greater than a predetermined threshold, is satisfied.

3. The electronic device according to claim 1, wherein the screen is viewable through the eye window frame and an eyepiece optical system, and
the position corresponding to the center of the screen is a position corresponding to an optical axis of the eyepiece optical system.

4. The electronic device according to claim 1, further comprising:
the display, the eye window frame, and an image sensor configured to capture an image of the eye.

5. The electronic device according to claim 1, wherein an indicator at which the eye is to look is displayed on the screen while varying a position of the indicator, and
the detecting unit detects, as the shifted viewing state, a state in which a predetermined condition, including a condition that on the eye image, a direction traveling from the position corresponding to the center of the screen toward the pupil image or the Purkinje image is opposite to a direction traveling from the position corresponding to the center of the screen toward the position in which the indicator is displayed, is satisfied.

6. The electronic device according to claim 1, wherein a plurality of indicators at which the eye is to look are displayed on the screen,
the plurality of indicators include two indicators sandwiching the center of the screen, and
the detecting unit detects, as the shifted viewing state, a state in which a predetermined condition, including a condition that a direction traveling from the position corresponding to the center of the screen toward the pupil image or the Purkinje image in a case looking at one of the two indicators is opposite to a direction traveling from the position corresponding to the center of the screen toward the pupil image or the Purkinje image in a case looking at the other of the two indicators, is satisfied.

7. The electronic device according to claim 1, wherein the detecting unit detects the shifted viewing state during a calibration operation for acquiring a parameter used to estimate the viewed point.

8. The electronic device according to claim 1, wherein the at least one memory and at least one processor further function as:
a control unit configured to perform control to display an indicator at which the eye is to look on the screen while varying a position of the indicator; and
a second estimating unit configured to estimate a range of the screen that includes a plurality of positions in which the indicator is viewable by the eye without the shifted viewing state being detected as a viewed field range in a state where the shifted viewing state is not detected, and
the processing unit determines the image display range on a basis of the viewed field range estimated by the second estimating unit.

9. The electronic device according to claim 8, wherein the indicator is an indicator used in a calibration operation of acquiring a parameter used to estimate the viewed point.

10. The electronic device according to claim 8, wherein the processing unit determines at least a part of the viewed field range as the image display range.

11. The electronic device according to claim 8, wherein the processing unit determines the image display range so that the image display range moves so as to include at least a part of the viewed field range.

12. The electronic device according to claim 8, wherein the control unit performs control on a plurality of sides of the screen to move the indicator closer to the center of the screen after the indicator is displayed on an edge of the screen until the shifted viewing state is no longer detected.

13. A control method of an electronic device capable of acquiring an eye image by capturing an image of an eye looking at a screen of a display through an eye window frame, the control method comprising:

estimating a viewed point of the eye on the screen on a basis of the eye image; and detecting a shifted viewing state in which the eye shifts from a position corresponding to a center of the screen on the eye image by determining whether or not a pupil image or a Purkinje image on the eye image satisfies a predetermined condition; and performing predetermined processing in a case where the shifted viewing state is detected, wherein the predetermined processing is processing to determine an image display range, which is a range of the screen in which an image is displayed, on a basis of the shifted viewing state detected by the detecting.

14. A non-transitory computer readable medium that stores a program, wherein the program causes a computer to execute a control method of an electronic device capable of acquiring an eye image by capturing an image of an eye looking at a screen of a display through an eye window frame, the control method includes:

estimating a viewed point of the eye on the screen on a basis of the eye image;

detecting a shifted viewing state in which the eye shifts from a position corresponding to a center of the screen on the eye image by determining whether or not a position of a pupil image or a Purkinje image on the eye image satisfies a predetermined condition; and performing predetermined processing in a case where the shifted viewing state is detected, and the predetermined processing is processing to determine an image display range, which is a range of the screen in which an image is displayed, on a basis of the shifted viewing state detected by the detecting.

* * * * *